US012644010B1

(12) United States Patent
Nuernberger

(10) Patent No.: US 12,644,010 B1
(45) Date of Patent: Jun. 2, 2026

(54) COATING LAYER COMPOSITION, EXTRUSION PRODUCT AND PROCESS FOR THE PREPARATION OF AN EXTRUSION PRODUCT

(71) Applicant: Michael Nuernberger, Wunsiedel (DE)

(72) Inventor: Michael Nuernberger, Wunsiedel (DE)

(73) Assignee: Michael Nuernberger, Wunsiedel (DE)

( * ) Notice: Subject to any disclaimer, the term of this patent is extended or adjusted under 35 U.S.C. 154(b) by 0 days.

(21) Appl. No.: 19/243,059

(22) Filed: Jun. 19, 2025

(51) Int. Cl.
| | |
|---|---|
| *C09D 127/06* | (2006.01) |
| *B29C 48/154* | (2019.01) |
| *C09D 7/40* | (2018.01) |
| *C09D 7/48* | (2018.01) |
| *C09D 7/61* | (2018.01) |

(52) U.S. Cl.
CPC .......... *C09D 127/06* (2013.01); *B29C 48/154* (2019.02); *C09D 7/48* (2018.01); *C09D 7/61* (2018.01); *C09D 7/69* (2018.01)

(58) Field of Classification Search
CPC .......... C09D 127/06; C09D 7/69; C09D 7/61; C09D 7/48; B29C 48/154
See application file for complete search history.

(56) References Cited

U.S. PATENT DOCUMENTS

| | | | |
|---|---|---|---|
| 3,502,611 A | | 3/1970 | Palmer et al. |
| 4,455,398 A | | 6/1984 | Budich et al. |
| 5,821,304 A | * | 10/1998 | Backman .................. B05B 5/03 |
| | | | 525/104 |
| 2003/0026974 A1 | | 2/2003 | Lenox et al. |
| 2007/0078191 A1 | | 4/2007 | Guhde et al. |

FOREIGN PATENT DOCUMENTS

| | | | | |
|---|---|---|---|---|
| DE | 10351820 A1 | * | 6/2005 | ............ C08L 51/003 |
| EP | 1698657 A1 | * | 9/2006 | ............ C08K 5/005 |

* cited by examiner

*Primary Examiner* — Shuangyi Abu Ali
(74) *Attorney, Agent, or Firm* — VIERING, JENTSCHURA & PARTNER mbB

(57) ABSTRACT

A coating layer composition including: 30 to 70 wt. % of a polyvinyl chloride; 1 to 5 wt. % of a heat stabilizer; 8 to 24 wt. % of a plasticizer; 2.5 to 30.0 wt. % of a HCl-reactive compound; 3 to 40 wt. % of a filler; and 1 to 8 wt. % of a pigment, based on the total weight of the coating layer composition, wherein the polyvinyl chloride has a K-value in the range of 75 to 100, wherein the HCl-reactive compound is selected from the group consisting of $CaCO_3$, hydrotalcite, zeolite, hydrocalumite, hydroxides of magnesium, hydroxides of aluminum, wollastonite, and mixtures thereof, wherein the filler is selected from the group consisting of talc, mica, pyrophyllite, kaolin, and mixtures thereof, and wherein the filler has a plate-shape.

15 Claims, 3 Drawing Sheets

COATING LAYER COMPOSITION, EXTRUSION PRODUCT AND PROCESS FOR THE PREPARATION OF AN EXTRUSION PRODUCT

TECHNICAL FIELD

This disclosure relates to coating layer compositions, extrusion products comprising a substrate and the coating layer composition, and processes for the preparation of the extrusion products.

BACKGROUND

Extrusion products are commonly used in construction. For example, extrusion products can be used as a siding product, that is, as an exterior surface covering on buildings such as residential homes to give the buildings aesthetically pleasing appearances.

In this respect, siding products based on vinyl (such as polyvinyl chloride (PVC)) are well-known. Vinyl siding products have the advantage of being able to be formed into a variety of shapes and colors by known extrusion and molding processes. In addition, vinyl siding products may be easily cleaned, are low maintenance, inexpensive, and can be installed quickly and easily on new construction or remodeling jobs without breaking. Vinyl siding products are resistant to physical deterioration (e.g., rotting) and insect attacks. Further, these materials do not support combustion and therefore may act as a flame retardant.

Despite the advantages associated with conventional siding products, for example conventional vinyl siding products, there are some disadvantages. For example, the siding product may be subject to heat distortion at elevated temperatures which may cause the siding product to warp or distend. In other words, conventional siding products, for example PVC-based siding products, heat up when used outdoors, especially when having a dark color surface appearance, and a high coefficient of linear thermal expansion, as often found in PVC-based siding products, in conjunction with a rather low softening temperature, as also often found in PVC-based siding products, results in deformation when exposed to sunlight. Such deformation in the siding product creates an unsightly appearance. A further problem with conventional siding products is a deterioration of appearance due to the effects of environmental factors such as weathering. As a result of the environmental exposure, a surface deterioration of the siding product may occur due to water-whitening, i.e., deterioration of organic components, such as organic polymers, organic binder agents, etc., in regions close to the surface of the siding product, resulting in a brightening and/or due to fading of colorants, for example pigments, in regions close to the surface of the siding product.

In other words, plastics utilized in conventional siding products, such as polyvinyl chloride, acrylic polymers, etc. are subject to ageing when used outdoors. For example, plastic surfaces tend to weather-related (UV light, water, water vapor exposure) superficial degradation, resulting in a rough, microporous surface, which brightens optically due to light scattering effects. Weathering effects resulting from UV light exposure can be simulated by artificial weathering in a so-called QUV-STD test and weathering effects resulting from water/water vapor exposure can be simulated by artificial weathering in a so-called QUV-VSI test, as will be explained in more detail below.

Moreover, when applying acrylic polymers, the extrusion processing for the manufacture of products comprising a substrate and a coating layer (captock) is problematic, e.g., due to deviating thermal expansion, shrinkage and/or flow behavior of acrylic polymer (present in capstock) and PVC (present in substrate). In addition, the extrusion product (for example co-extrusion product) obtained may show insufficient impact strength, as acrylic polymers are brittle.

Attempts have been made to make improved siding products that address the negative aspects of conventional siding such as described above. Despite the attempts to provide an improved siding product, there still exists a need in the art for a siding product with improved resistance to surface deterioration due to environmental exposure, while, at the same time providing for advantageous extrusion processing properties, in particular in the manufacture of extrusion products comprising a substrate and a coating layer (such as a siding product), for example in a co-extrusion process, that meets the mechanical properties required for the intended application and that can be easily and cost-efficiently prepared.

Similar considerations also apply for extrusion products that are commonly used in construction different from the siding products discussed above. For example, the extrusion product may be a window profile, a decking profile, a rainwater gutter, a fence, or the like.

BRIEF SUMMARY

An essential consideration of the present disclosure is the processability and stabilization of PVC, which, for example, requires certain mechanical properties as well as thermal stabilization to enable processing in an extruder. Moreover, PVC extrusion products obtained, e.g., PVC extrusion products used in construction, for example siding products, also require weathering stability, as can be assessed, for example, by artificial weathering in the QUV-STD test and the QUV-VSI test. In this respect, a sufficient thermal stabilization does not necessarily result in a sufficient weathering stability, which underlies different deterioration mechanisms as compared to thermal degradation. For example, higher amounts of phthalates (and also other plasticizers) in the coating layer composition result in inferior weathering stability (as can be seen, for example, from artificial weathering in the QUV-STD test and the QUV-VSI test).

According to the first aspect, the present disclosure is directed to a coating layer composition comprising: (i) 30 to 70 wt. % of a polyvinyl chloride, (ii) 1 to 5 wt. % of a heat stabilizer; (iii) 8 to 24 wt. % of a plasticizer; (iv) 2.5 to 30 wt. % of a HCl-reactive compound, (v) 3 to 40 wt. % of a filler; and (vi) 1 to 8 wt. % of a pigment, based on the total weight of the coating layer composition, wherein the polyvinyl chloride has a K-value in the range of 75 to 100, wherein the HCl-reactive compound is selected from the group consisting of $CaCO_3$, hydrotalcite, zeolite, hydrocalumite, hydroxides of magnesium, hydroxides of aluminum, wollastonite, and mixtures thereof, wherein the filler is selected from the group consisting of talc, mica, kaolin and mixtures thereof, and wherein the filler has a plate-shape.

According to the second aspect, the present disclosure is directed to a coating layer composition comprising 30 to 70 wt. % of a polyvinyl chloride, 1 to 5 wt. % of a heat stabilizer; 8 to 24 wt. % of a plasticizer; 2.5 to 30.0 wt. % of a HCl-reactive compound, 0 to 40 wt. % of a filler selected from the group consisting of talc, mica, pyrophyllite, kaolin and mixtures thereof; and 1 to 8 wt. % of a pigment, based on the total weight of the coating layer composition, wherein the polyvinyl chloride has a K-value in the range of 75 to 100, and wherein the HCl-reactive compound is selected from the group consisting of wollastonite and a mixture of wollastonite and at least one of CaCO₃, hydrotalcite, zeolite, hydrocalumite, hydroxides of magnesium, and hydroxides of aluminum.

According to the third aspect, the present disclosure is directed to an extrusion product comprising a substrate and a coating layer, wherein the coating layer comprises the coating layer composition according to the first aspect, and wherein the substrate comprises at least 60 wt. % of a further polyvinyl chloride, based on the total weight of the substrate, the further polyvinyl chloride having a K-value of 74 or less.

According to the fourth aspect, the present disclosure is directed to a process for the preparation of an extrusion product comprising the steps of: providing a coating layer composition according to the first aspect; providing a substrate composition comprising at least 60 wt. % of a further polyvinyl chloride, based on the total weight of the substrate, the further polyvinyl chloride having a K-value of 74 or less; feeding each of the coating layer composition and the substrate composition to an extruder, and and extruding the coating layer composition and the substrate composition to obtain an extrusion product.

The foregoing and other objects, features, and advantages of the disclosure will appear more fully hereinafter from a consideration of the detailed description that follows. The detailed and specific embodiments of the invention described below are for illustrative purposes only, i.e., various modifications may be made without departing from the invention. The present invention is limited only by the appended claims. All embodiments disclosed and claimed herein may be implemented and practiced in view of the disclosure without undue experimentation. The content of the documents referred to herein is to be understood in its entirety as part of this document.

DETAILED DESCRIPTION

Unless defined otherwise, all technical and scientific terms used herein have the same meaning as commonly understood by one of ordinary skill in the art to which the disclosure belongs. Although any methods and materials similar or equivalent to those described herein can be used in the practice or testing of the present disclosure, the preferred methods and materials are described herein. All references cited herein are each incorporated by reference in their entireties, including all data, tables, figures, and text presented in the cited references.

Figure 1:
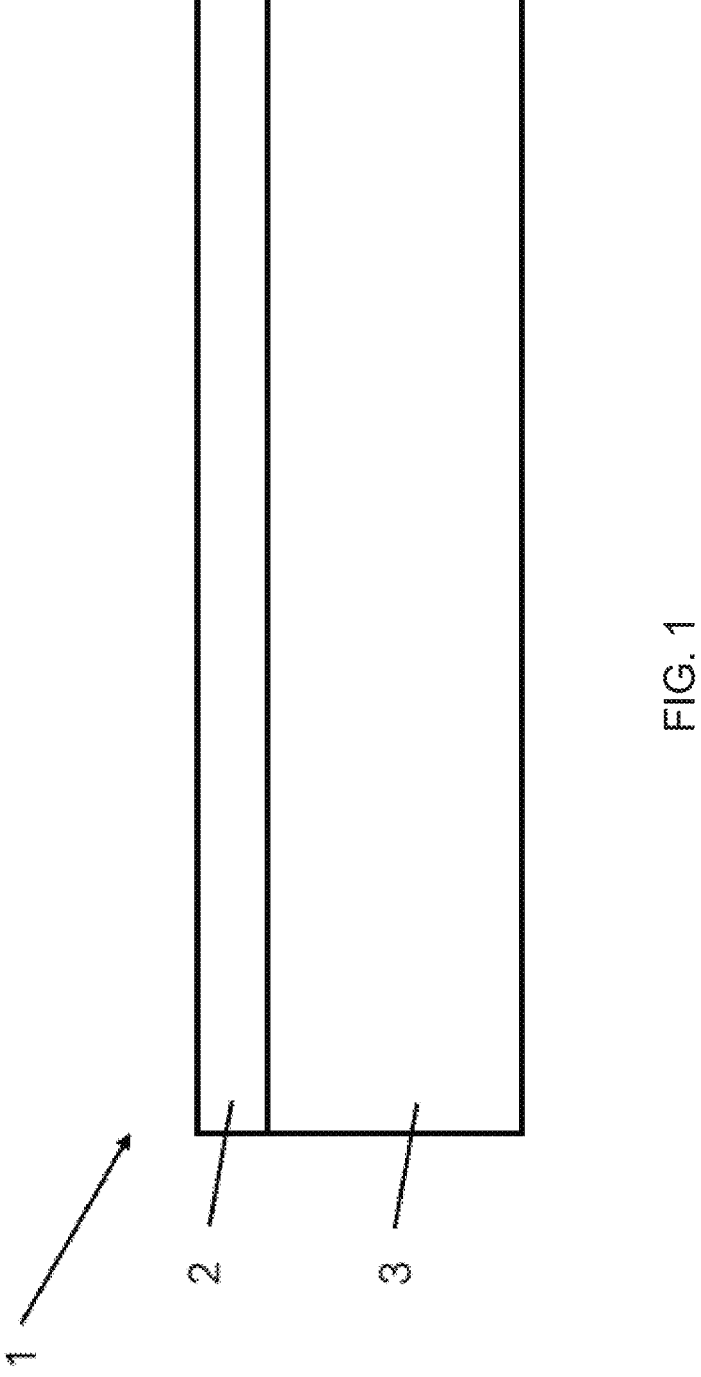
FIG. 1 shows a cross-section of a coextruded siding product according to embodiments.

FIG. 1 shows a cross-section of a coextruded siding product 1 with a coating layer 2 and a substrate 3, wherein the substrate has a plate-shape.

Figure 2:
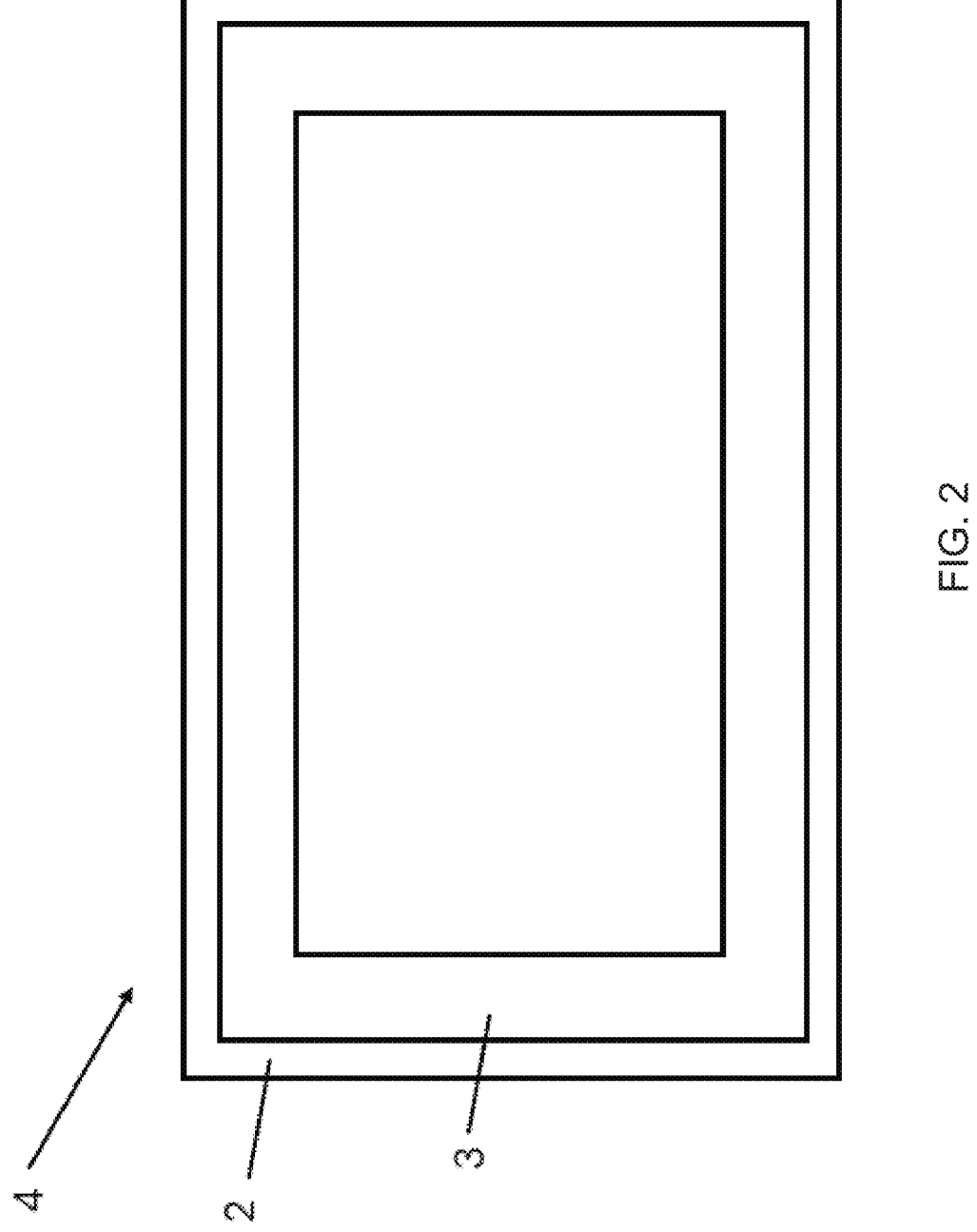
FIG. 2 shows a cross-section of a coextruded fence profile according to embodiments.

FIG. 2 shows a cross-section of a coextruded fence profile 4 with a coating layer 2 and a substrate 3, wherein the substrate 3 has a hollow section-shape.

Figure 3:
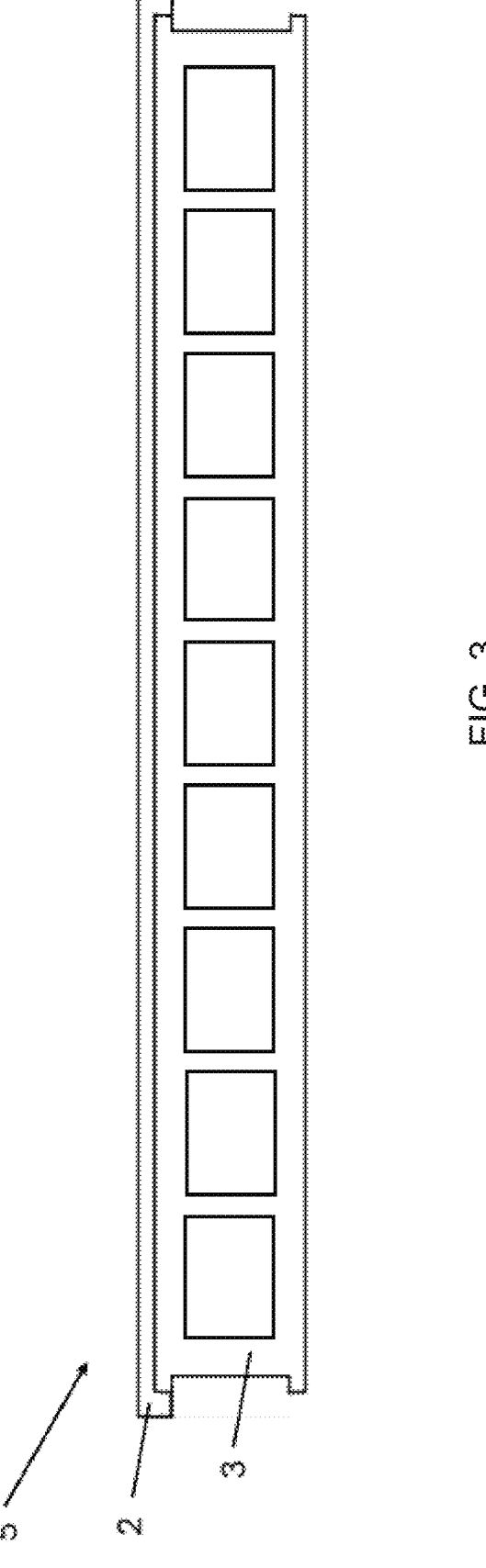
FIG. 3 shows a cross-section of coextruded decking profile according to embodiments.

FIG. 3 shows a cross-section of a coextruded decking profile 5 with a coating layer 2 and a substrate 3, wherein the substrate 3 has a twin-wall sheet-shape.

The present disclosure is directed to a coating layer composition for the preparation of an extrusion product, such as an extrusion product commonly used in construction, for example a siding product, a window profile, a decking profile, a rainwater gutter, a fence, or the like. The extrusion product may comprise a substrate and a coating layer, with a coating layer composition and a substrate composition being utilized to form a composite extrusion product, for example in the form of a siding product, a window profile, a decking profile, a rainwater gutter, a fence, or the like. Moreover, the extrusion product may be formed in an extrusion process, preferably a co-extrusion process, as outlined in more detail below.

An aspect of the present disclosure is directed at a coating layer composition comprising 30 to 70 wt. % of a polyvinyl chloride, 1 to 5 wt. % of a heat stabilizer; 8 to 24 wt. % of a plasticizer; 2.5 to 30.0 wt. % of a HCl-reactive compound, 3 to 40 wt. % of a filler; and 1 to 8 wt. % of a pigment.

The coating layer composition may be present in any convenient form, for example in the form of a flake, granule, pellet, and/or powder.

The polyvinyl chloride provides the backbone of the coating layer composition and provides strength, flexibility, etc. to a final product, such as an extruded coating layer. The polyvinyl chloride can be any polyvinyl chloride suitable for the intended application.

For example, the polyvinyl chloride of the coating layer composition can comprise S-PVC, i.e., PVC obtained by suspension polymerization, E-PVC, i.e., PVC obtained by emulsion-polymerization, M-PVC, i.e., PVC obtained by bulk polymerization, C-PVC, i.e., PVC that is chlorinated, and mixtures thereof. In other words, the polyvinyl chloride of the coating layer composition can be selected from the group consisting of S-PVC, E-PVC, M-PVC, CPVC, and mixtures thereof.

S-PVC can be prepared in a suspension polymerization process where vinyl chloride is liquefied under pressure and mixed with water. Intensive stirring produces a suspension of very small vinyl chloride droplets in water. A suitable polymerization initiator, such as azobis(isobutyronitrile) (AIBN), is used, resulting in a product called S-PVC. E-PVC can be prepared in an emulsion polymerization process, where vinyl chloride is stirred into water as small droplets with the help of an emulsifier and hydrogen peroxide or potassium peroxodisulphate, for example, are used as water-soluble initiators. At elevated temperatures E-PVC is formed from the monomer droplets. M-PVC can be prepared in a bulk polymerization process, where polymerization is carried out directly in liquid vinyl chloride with a soluble initiator, usually an organic peroxide. M-PVC can be utilized, for example, for applications where high transparency is required. C-PVC can be prepared by chlorination of polyvinyl chloride via a free radical chlorination reaction. The reaction is typically initiated by application of thermal or UV energy utilizing various approaches, e.g., an approach where chlorine gas is decomposed into free radical chlorine which is then reacted with PVC in a post-production step, essentially replacing a portion of the hydrogen in the PVC with chlorine.

The polyvinyl chloride of the coating layer may consist of S-PVC, E-PVC, M-PVC, C-PVC, and mixtures thereof. The polyvinyl chloride of the coating layer composition may comprise S-PVC in an amount of at least 70 wt. %, preferably at least 90 wt. %, for example 70 to 100 wt. %, 80 to 100 wt. %, 75 to 95 wt. %, 80 to 90 wt. %, etc., based on the total weight of the polyvinyl chloride of the coating layer composition. The polyvinyl chloride of the coating layer composition may consist of S-PVC. However, the present disclosure is not limited to a coating layer composition comprising S-PVC. The coating layer composition may comprise other types of PVC, such as E-PVC, M-PVC, C-PVC, and mixtures thereof, or comprise a combination of S-PVC with other types of PVC, such as E-PVC, M-PVC, C-PVC, and mixtures thereof.

The coating layer composition may comprise polyvinyl chloride in an amount of 30 to 70 wt. %, based on the total weight of the coating layer composition. For example, the coating layer composition may comprise the polyvinyl chloride in an amount of 30 to 70 wt. %, 35 to 60 wt. %, 38 to 55 wt. %, 38 to 52 wt. %, etc., based on the total weight of the coating layer composition.

It is a finding of the present disclosure to provide a coating layer composition comprising polyvinyl chloride having a high K-value in the range of 75 to 100.

As used herein, the term "K-value" refers to the molecular weights of the polymers, based upon a viscosity measurement. The K-value is a parameter that is related to the average (arithmetic mean) molecular weight, is calculated from the viscosity ratio according to an equation given by Fikentscher and can be determined according to DIN EN ISO 1628-1:2021-06. A further explanation of this measurement can be found, for example, in the Encyclopedia of Polymer Science and Technology (1971) at volume 14, page 517.

The K-value of the polyvinyl chloride, i.e., the polyvinyl chloride of the coating layer composition can be at least 75, at least 79, at least 85, or at least 89. For example, the K-value can be in the range of 75 to 100, in the range of 80 to 100, in the range of 85 to 100, in the range of 79 to 95, in the range of 84 to 90, etc.

In case the coating layer composition comprises a mixture of polyvinyl chlorides with different K-values an arithmetic mean (by weight) of the different K-values is formed. For example, in case of a mixture comprising a 50 wt. % of a polyvinyl chloride having a K-value of 70 (K-70) and 50 wt. % of a polyvinyl chloride having a K-value of 80 (K-80) is referred to as a 100 wt. % of a polyvinyl chloride having a K-value of 75. This (mass) proportional arithmetic mean of the K-value is also referred to as a mixed K-value.

The use of polyvinyl chloride with a high K-value as a component for the coating layer composition is advantageous, as a melt volume-flow rate (MVR) can be adjusted to relatively low values. The MVR is used to characterize the flow behavior of a thermoplastic under certain pressure and temperature and is a measure of the viscosity of a plastic melt. The coating layer composition may have an MVR of less than 70 cm³/10 min, less than 60 cm³/10 min, or less than 50 cm³/10 min. For example, the coating layer composition may have an MVR in the range of 5 to 70 cm³/10 min, in the range of 10 to 60 cm³/10 min, in the range of 15 to 50, etc. The MVR can be determined according to DIN EN ISO 11 33-1:2022-10 (356° F., 50 kg, DIE 5).

When adjusting the MVR coating layer composition to relatively low values as outlined above, the melt viscosity of the coating layer composition during the extrusion process is relatively high. This results, for example, in a reduced adhesion to processing means downstream of the extrusion die, such as embossing rollers, calibrating tools, sufficient melt stiffness to achieve desired coating thickness, or the like, as compared to a situation where polyvinyl chloride with a low K-value is used. Furthermore, the use of polyvinyl chloride with a high K-value results in a reduced migration of plasticizer present in the coating layer composition, as compared to a situation when polyvinyl chloride with a low K-value is used. Moreover, the use of polyvinyl chloride with a high K-value results in improved weathering stability, as can be seen, e.g., from artificial weathering in the QUV-STD test.

The coating layer composition may comprise heat stabilizer in an amount of 1 to 5 wt. %, based on the total weight of the coating layer composition. For example, coating layer composition may comprise heat stabilizer in an amount in the range of 1.5 to 4.0 wt. %, in the range of 2 to 3 wt. %, in the range of 2.1 to 2.7 wt. %, etc., based on the total weight of the coating layer composition.

The heat stabilizer is not particularly limited and can be selected according to needs. For example, suitable heat stabilizers are described in the "PVC Handbook" (Hanser Publishers, ISBN 1-56990-379-4, 2005, Chapter 4. "PVC Stabilizers" on page 95 ff) or in in the "Plastics Additives Handbook" (Hanser Publishers, ISBN 978-3-446-40801-2, 6$^{th}$ Edition 2009, Chapter 3 "PVC Stabilizers and Plasticizers" on page 425 ff). The heat stabilizer may be selected from the group consisting of mixed metal stabilizers, such as liquid mixed metal stabilizers, lead stabilizers, organotin stabilizers, and mixtures thereof.

The mixed metal stabilizers can be based on Ba, Zn, Ca, Mg or K carboxylates. The metal components of the metal carboxylates are, e.g., Ca/Zn, Ba/Zn, Mg/Zn and mixtures thereof, and the carboxylate components are, e.g., carboxylates of fatty esters, such as stearates, laurates, oleates, or the like or carboxylates of alkyl benzoic acids. In other words, the heat stabilizer may be a mixed metal stabilizer selected from the group consisting of Ba/Zn carboxylate, Ca/Zn carboxylate, Mg/Zn carboxylate, and mixtures thereof, for example a liquid mixed metal stabilizer selected from the group consisting of Ba/Zn carboxylate, Ca/Zn carboxylate, Mg/Zn carboxylate, with the carboxylate being carboxylates of fatty esters and/or carboxylates of alkyl benzoic acids.

It is advantageous to use a polyvinyl chloride having a high K-value in conjunction with a mixed metal stabilizer, such as a Ca/Zn stabilizer. The coating layer composition may comprise polyvinyl chloride having a K-value 75 to 100 in combination with a mixed metal stabilizer. For example, the coating layer composition may comprise polyvinyl chloride having a K-value 80 to 100 in combination with Ca/Zn carboxylate.

Lead stabilizers were among the first materials to be used as stabilizers to prevent the decomposition of PVC. The lead stabilizer may be selected from the group consisting of tribasic lead sulfate (3 PbO*PBSO₄*H₂O), dibasic lead stearate (2 PbO*Pb(OOC—C₁₇H₃₅)₂), dibasic phthalate (2 PbO*Pb(OOC)₂C₆H₄), dibasic lead phosphite (2 PbO*PbHPO₃*2H₂O), lead stearate (Pb(OOC—C₁₇H₃₅)₂), and mixtures thereof. However, lead stabilizers are no longer used in many countries due to a voluntary commitment by the PVC manufacturing industry. Thus, the coating layer composition layer may comprise a heat stabilizer different from a lead stabilizer. Preferably the coating layer composition layer does not comprise a lead stabilizer.

Organotin compounds used as PVC stabilizers are based on tetravalent tin. Physical and chemical properties depend on the nature and ratio of the chemical groups linked to the tin atom. In this regard, organic substituents can be attached to the central tin through a carbon atom, i.e. mono or dialkyl tin, such as mono or dibutyl tin, mono or dioctyl tin, butyl octyl tin, or the like. For example, the organotin stabilizer may be selected from the group consisting of mono and dibutyl tin, isooctyl mercaptoacetate, mono and dimethyl tin isooctyl mercaptoacetate, mono and dioctyl tin isooctyl mercaptoacetate, mono and dimethyl tin 2-mercaptoethyl carboxylate sulfide, mono and dibutyl-tin sulfide, and mixtures thereof. Moreover, the organotin stabilizer may be a non-sulfur containing organotin stabilizer may, such a dibutyl-tin alkylmaleate, dibutyl-tin laurate maleate, dibutyl tin dilaurate, or the like.

It is a finding of the present disclosure that the application of organotin stabilizers as heat stabilizers result in inferior QUV-VSI test results. Thus, the coating layer composition layer may comprise a heat stabilizer different from an organotin stabilizer. Preferably the coating layer composition layer does not comprise an organotin stabilizer.

Plasticizers protect PVC from harmful UV radiation from sunlight by absorbing the same. PVC is particularly affected at wavelengths of 310 and 370 nm, where a PVC absorption peak is typically present. When the PVC deteriorates, resulting micropores are filled with air. Since air in the micropores has a different refractive index compared to the surrounding PVC matrix incident irradiation is scattered and the optical color impression of reflected light is brightened, which is referred to as chalking or fading. The refractive index of air is 1 and the refractive index of PVC is typically about 1.54, resulting in a refractive index difference of 0.54. The plasticizers can migrate to the surface in the PVC matrix, thereby counteracting the chalking (fading) resulting from a deterioration of the PVC surface.

The coating layer composition may comprise plasticizer in an amount of 8 to 24 wt. %, based on the total weight of the coating layer composition. For example, coating layer composition may comprise plasticizer in an amount in the range of 10 to 20 wt. %, in the range of 12 to 18 wt. %, etc., based on the total weight of the coating layer composition. If the plasticizer is applied in an amount of less than 8 wt. % chalking (fading) occurs after approx. 3000 h STD-QUV test and if the plasticizer is applied in an amount of more than 24 wt. % the extruded coating layer becomes too soft, and problems related to processing occur, for example adhesion to processing tools.

The plasticizer of the coating layer composition is not particularly limited and can be selected according to needs. For example, suitable plasticizers are described in the "Plastics Additives Handbook" (Hanser Publishers, ISBN 978-3-446-40801-2, 6$^{th}$ Edition 2009, Chapter 3 "PVC Stabilizers and Plasticizers" on page 425 ff) or in the "Handbook of Plasticiser" (ChemTec Publishing, Georg Wypych, ISBN 978-1-895198-50-8, 2012), Chapter 2 "Plasticiser Types" on page 7ff.

The plasticizer of the coating layer composition may be selected from the group consisting of epoxidized vegetable oils (EVO), epoxidized fatty acids, epoxidized fatty acid esters, phthalic acid esters, adipic acid esters, glutaric acid esters, sebacic acid esters, succinic acid esters, benzoic acid esters, citric acid esters, cyclohexanedicarboxylic acid esters, terephthalic acid esters, trimellitic acid esters, alkylsulfonic acid esters, glyceric acid esters, and mixtures thereof.

For example, the plasticizer of the coating layer composition may be selected from the group consisting of epoxidized vegetable oils (EVO), epoxidized fatty acids, epoxidized fatty acid esters, and mixtures thereof.

The coating layer composition may include plasticizer in an amount of 8 to 24 wt. %, the plasticizer comprising epoxidized vegetable oil (EVO), epoxidized fatty acid, and/or epoxidized fatty acid ester, and a polyvinyl chloride in an amount of 30 to 70 wt. %, the polyvinyl chloride comprising S-PVC, E-PVC, M-PVC, and/or CPVC, based on the total weight of the coating layer composition, wherein a ratio of the amount of the plasticizer to the amount of the polyvinyl chloride (plasticizer/PVC) is in the range of 0.23 to 0.37. For example, a ratio of the amount of the plasticizer to the amount of the polyvinyl chloride (plasticizer/PVC) may be in the range of 0.27 to 0.35, in the range of 0.28 to 0.33.

The amount of plasticizer comprised in the coating layer composition influences the Vicat A softening temperature (VST). The coating layer composition may have VST of more than 75° C. For example, the coating layer composition may have VST of more than 80° C., more than 85° C., more than 86° C., more than 90° C., more than 95° C., etc. The VST can be determined according to ASTM D 1525 (starting temp. 73° F., heat-up rate 50 K/h, holding time 5 min).

The coating layer composition may include plasticizer in an amount of 8 to 24 wt. %, the plasticizer consisting of epoxidized vegetable oil (EVO), epoxidized fatty acid, and/or epoxidized fatty acid ester, and a polyvinyl chloride in an amount of 30 to 70 wt. %, the polyvinyl chloride consisting of S-PVC, E-PVC, M-PVC, and/or CPVC, based on the total weight of the coating layer composition wherein a ratio of the amount of the plasticizer to the amount of the polyvinyl chloride (plasticizer/PVC) is in the range of 0.23 to 0.37. For example, the plasticizer may consist of epoxidized vegetable oil (EVO) and the polyvinyl chloride may consist of S-PVC.

For example, the plasticizer of the coating layer composition may selected from the group consisting of epoxidized soybean oil (ESBO), epoxidized linseed oil (ELO), epoxidized sunflower oil, epoxidized tall oil, epoxidized octyl soyate, epoxidized methyl soyate (EMS), butyl epoxy soyate, methyl epoxy linseedate, butyl epoxy linseedate, epoxidized octyl stearate, ethyl hexyl epoxy stearate, epoxidized pentaerythrit tetra soyate, epoxidized propylene glycol dioleate, epoxidized propylene glycol disoyate, epoxidized ethylene glycol disoyate, epoxidized sucrose octa soyate, rapeseed methyl ester diacetate, octyl epoxy tallate (OET), and mixtures thereof.

Epoxidized vegetable oils and epoxidized fatty acids can be obtained through the oxidation of vegetable oils and fatty acids with peroxide acids. Epoxidized vegetable oils are a bio-based class of plasticizers produced by the esterification of vegetable oils with polyols. A typical example of a plasticizer belonging to this class commonly used in industrial practice is epoxidized soybean oil ESBO produced in the esterification of ESBO using glycerin. The advantages of this plasticizer include high temperature stability and compatibility to poly vinyl chloride. Epoxidized linseed oil (ELO) has been proven suitable as a plasticizer in PVC processing. Good PVC plasticization properties are also demonstrated by epoxidated stearates, e.g., iso-amyl epoxy stearate and 2-ethylhexyl epoxy stearate. In addition to epoxidation, other methods that render natural oils or derivatives of fatty acid esters more compatible with polar polymers such as PVC are known, for example acetylation as in acetylated castor oil or acetylated stearate esters.

For example, the plasticizer of the coating layer composition may comprise a plasticizer selected from the group consisting of epoxidized vegetable oils (EVO), epoxidized fatty acids, epoxidized fatty acid esters, and mixtures thereof, in an amount of at least 50 wt. %, at least 70 wt. %, at least 85 wt. %, at least 95 wt. %, etc., based on the total weight of the plasticizer of the coating layer composition. That is, the plasticizer of the coating layer composition may consist of a plasticizer selected from the group consisting of epoxidized vegetable oils (EVO), epoxidized fatty acids, epoxidized fatty acid esters, and mixtures thereof, or may comprise a plasticizer selected from the group consisting of epoxidized vegetable oils (EVO), epoxidized fatty acids, epoxidized fatty acid esters, and mixtures thereof in combination with a further plasticizer, such as phthalic acid ester.

The plasticizer of the coating layer composition may comprise an epoxidized vegetable oil (EVO), such as an epoxidized soybean oil (ESBO). For example, the plasticizer of the coating layer composition may comprise an epoxidized vegetable oil (EVO), such as an epoxidized soybean oil (ESBO), in an amount of at least 50 wt. %, at least 70 wt. %, at least 85 wt. %, at least 95 wt. %, etc., based on the total weight of the plasticizer of the coating layer composition. That is, the plasticizer of the coating layer composition may consist of an epoxidized vegetable oil (EVO) or may comprise an epoxidized vegetable oil (EVO) in combination with a further plasticizer, such as phthalic acid ester.

It is advantageous to use a plasticizer comprising an epoxidized vegetable oil (EVO) due to improved weathering stability, as can be demonstrated with the QUV-STD test and the QUV-VSI test. Moreover, good and balanced artificial weathering results can be obtained in case the epoxidized vegetable oil (EVO) is provided alone or only together with small quantities of a further plasticizer, such as phthalic acid ester.

In other words, according to an embodiment it is preferred that epoxidized vegetable oil (EVO) is used as plasticizer and, in case the epoxidized vegetable oil (EVO) is used in a combination with another plasticizer, such as phthalic acid ester, the "another plasticizer" is preferably only used in small quantities (or not at all). For example, higher amounts of phthalates (and also other plasticizers) in the coating layer composition result in inferior artificial weathering (QUV-STD and QUV-VSI) results.

The epoxidized vegetable oils (EVO) not only act as plasticizers and UV absorbers but also intercept HCl released during PVC decomposition (e.g., by UV light, heat, etc.). Also, epoxidized vegetable oils (EVO) may undergo a chemical grafting (side chain bonding) onto the PVC polymer at labile chloride sites in the presence of mixed metal stabilizer. This is also described in the "PVC Handbook" (Hanser Publishers, ISBN 1-56990-379-4, 2005, Chapter 5. "Plasticizers" on page 181 ff.

In other words, it is a finding of the present disclosure that the coating layer composition can be improved (e.g., improved heat stabilization and/or improved UV light stabilization) by providing a plasticizer comprising an epoxidized vegetable oil (EVO) in combination with a heat stabilizer comprising a mixed metal stabilizer. For example, the coating layer composition may comprise a plasticizer consisting of an epoxidized vegetable oil (EVO) in combination with a heat stabilizer consisting of a mixed metal stabilizer.

The epoxidized vegetable oils (EVO) applied as plasticizers in the coating layer composition may comprise or consist of linseed oil epoxidates, vernonia oil epoxidates, sunflower oil epoxidates, castor oil epoxidates and soybean oil epoxidates, such as epoxidized soybean oil (CAS No. 8013-07-8). The oxirane oxygen content of the epoxidized vegetable oils (EVO) may be less than 7 wt. %, for example less than 6 wt. %, based on the total weight of the epoxidized vegetable oil (EVO), determined according to ASTM D 1652-97. Moreover, the iodine value of the epoxidized vegetable oil (EVO) may be less than 5, for example less than 3, determined according to ASTM D 5768-02 (2022).

The epoxidized vegetable oils (EVO) applied as plasticizers in the coating layer composition may comprise or consist of one or more trigylcerides of epoxidized fatty acids whose fatty acids have a carbon length of 17 to 23 carbon atoms and contain at least one epoxide group.

Moreover, as outlined above, the plasticizer of the coating layer composition may comprise phthalic acid ester. For example, the plasticizer of the coating layer composition may comprise phthalic acid ester and a further plasticizer, such as a plasticizer selected from the group consisting of epoxidized vegetable oils (EVO), epoxidized fatty acids, epoxidized fatty acid esters, and mixtures thereof.

In case the plasticizer of the coating layer composition comprises phthalic acid ester the phthalic acid ester may be selected from the group consisting of diisodecyl phthalate (DIDP), diisonyl phthalate (DINP), di(2-ethylhexyl) phthalate (DEHP), di(2-propylheptyl) phthalate (DPHP), dibutyl phthalate (BBP), diisooctyl phthalate (DNOP), diisobutyl phthalate (DIBP), diisohexyl phthalate, diisoheptyl phthalate, dioctyl phthalate, diisoundecyl phthalate, diisotredecyl phthalate, and mixtures thereof.

The coating layer composition may comprise: (i) a first plasticizer selected from the group consisting of epoxidized vegetable oils (EVO), epoxidized fatty acids, epoxidized fatty acid esters, and mixtures thereof; and (ii) a second plasticizer being a phthalic acid ester, wherein preferably the first plasticizer is comprised in an amount of 8 to 21 wt. % and the second plasticizer is comprised in an amount of 0.1 to 4.5 wt. %, based on the total weight of the coating layer composition. The coating layer composition may comprise phthalic acid ester in an amount of less than 4.5 wt. %, based on the total weight of the coating layer composition. For example, the coating layer composition may comprise the phthalic acid ester in an amount of less than 3 wt. %, in an amount of less than 1.5 wt. %, in an amount in the range of 0.1 to 3.0 wt. %, in an amount in the range of 0.3 to 1.5 wt. %, in an amount in the range of 0.5 to 1.0 wt. %, etc., based on the total weight of the coating layer composition. In case phthalic acid ester is applied in an amount of 4.5 wt. % or more inferior artificial weathering results (QUV-STD und QUV-VSI tests) are observed.

The coating layer composition may comprise a mixed metal stabilizer selected from the group consisting of Ba/Zn carboxylate, Ca/Zn carboxylate, Mg/Zn carboxylate, and mixtures thereof as the heat-stabilizer in combination with a plasticizer selected from the group consisting of epoxidized vegetable oils (EVO), epoxidized fatty acids, epoxidized fatty acid esters, and mixtures thereof, as the plasticizer of the coating layer composition.

Other plasticizers that may be used include adipates, such as dialkyl adipates (for example diethylhexyl adipate (DEHA), diisooctyl adipate, diisononyl adipate, etc.); polyesters of adipic acid (for example dialkyl adipates such as diethylhexyl adipate (DEHA), diisooctyl adipate, diisononyl adipate, etc.); polyesters of glutamic acid (such as Ultramoll® IV from Lanxess Deutschland GmbH); benzoates (for example alkyl benzoates, glycol benzoates, etc.), citrates (for example citric acid trialkyl esters, acylated citric acid trialkyl esters, such as acetyl tributyl citrate (ATBC)); cyclohexanedicarboxylates (for example dialkyl esters of 1,2-, 1,3- or 1,4-cyclohexanedicarboxylic acid); terephthalates (for example dialkyl terephthalates, such as DEHTP (di(2-ethylhexyl) terephthalate) or DOTP dioctyl terephthalate); trimellitates (for example trialkyltrimellitates, such as tri(2-ethylhexyl) trimellitate, tri(isooctyl) trimellitate, tri(isononyl) trimellitate, etc.); 1,2-dicyclohexyl-based plasticizers (such as 1,2-cyclohexanedicarboxylic acid di-isononyl ester (DINCH)); alkyl sulfonic acid esters of phenol (such as Mesamoll® from Lanxess Deutschland GmbH); glycerol esters; dialkyl esters of dianhydrohexitol (such as isosorbide); acetylated laurates; furandicarboxylates; succinates; sulfonamides; sulfonates; oligomeric or polymeric esters based on adipic, succinic, or sebacic acid, phosphates; or the like.

A further advantage can be seen in that a coating layer, e.g., in the form of a capstock of a siding product, a decking product, a window frame, etc., comprising plasticizers can be metabolized more easily by microorganisms, especially fungi, when used outdoors than a matrix without plasticizers. Furthermore, the plasticizer migrates over longer periods of time and the plasticizer concentration in the upper layer decreases over time.

The coating layer composition further comprises a HCl-reactive compound in an amount of 2.5 to 30.0 wt. %, based on the total weight of the coating layer composition. For example, the coating layer composition may comprise a HCl-reactive compound in an amount in the range of 2.5 to 20.0 wt. %, in the range of 5.0 to 18.0 wt. %, in the range of 7.0 to 16.0 wt. %, etc., based on the total weight of the coating layer composition.

In case the HCl-reactive compound of the coating layer composition is comprised in an amount below 2.5 wt. % a sudden (not gradual) deterioration of the artificial weathering results due to chalking (fading) can be witnessed. For example, inferior weathering results due to chalking (fading) occur from approx. 7000 h onwards, observed, e.g., in the QUV-STD test. In other words, samples obtained from the coating layer composition still show excellent $\Delta$E-values at 6000 h in the QUV-STD test and at 7000 h in the QUV-STD test $\Delta$E-values suddenly increase significantly, e.g. to $\Delta$E-values of 8 or higher. Moreover, in case the HCl-reactive compound is used without the filler of the coating layer composition (described in detail below) or in case the HCl-reactive compound is used in amounts of more than 30.0 wt %, the $\Delta$E-values QUV-VSI test increase significantly. The QUV-VSI test differs from the QUV-STD test only in the longer dwell times in the condensation phase, i.e. the samples are exposed to higher levels of water/water vapor. This poor performance in the QUV-VSI test is also surprising. This is even more pronounced in case the HCl-reactive compound is used in high amounts in the absence of a filler as described in more detail below.

That is, the HCl-reactive compound can capture HCl in the event of PVC decomposition and/or can react with the resulting PVC matrix.

The HCl-reactive compound may be selected from the group consisting of $CaCO_3$, hydrotalcite, zeolite, hydrocalumite, hydroxides of magnesium, hydroxides of aluminum, wollastonite, and mixtures thereof. For example, the HCl-reactive compound may be selected from the group consisting of $CaCO_3$, wollastonite, and mixtures thereof. For example, the HCl-reactive compound may consist of $CaCO_3$, wollastonite, and mixtures thereof. In other words, the HCl-reactive compound of the coating layer composition may be selected from the group consisting of $CaCO_3$, wollastonite, and mixtures thereof, and is present in an amount of 100 wt. %, based on the total weight of the HCl-reactive compound.

For example, the coating layer composition may comprise Ca/Zn carboxylate as the heat-stabilizer, wherein the plasticizer is selected from the group consisting of epoxidized vegetable oils (EVO), epoxidized fatty acids, epoxidized fatty acid esters, and mixtures thereof, and wherein the HCl-reactive compound is selected from the group consisting of $CaCO_3$, wollastonite, and mixtures thereof.

$CaCO_3$ can be applied in the form of finely divided uncoated or coated (e.g., coated with stearic acid) ground $CaCO_3$ (GCC). Moreover, $CaCO_3$ can be applied in the form of precipitated $CaCO_3$ (PCC). The use of coated (e.g., coated with stearic acid) ground $CaCO_3$ (GCC) may be preferred because the coating of the chalk leads to better dispersibility. In contrast, wollastonite is an HCl-reactive compound that can be easily dispersed in PVC even without a stearic acid coating/treatment.

For example, the $CaCO_3$ can have a particle size average $D50_{gls}$ (particle diameter at 50% of the cumulative distribution) determined by gravitational liquid sedimentation according to ISO 13317-3:2001-03 of below 3 μm, for example below 1.5 μm.

The coating layer composition may include HCl-reactive compound in an amount of 2.5 to 30.0 wt. %, the HCl-reactive compound comprising $CaCO_3$, hydrotalcite, zeolite, hydrocalumite, hydroxides of magnesium, hydroxides of aluminum and/or wollastonite and polyvinyl chloride in an amount of 30 to 70 wt. %, based on the total weight of the coating layer composition, wherein a ratio of the amount of the HCl-reactive compound to the amount of the polyvinyl chloride (HCl-reactive compound/PVC) is in the range of 0.03 to 0.50. For example, a ratio of the amount of the HCl-reactive compound to the amount of the polyvinyl chloride (HCl-reactive compound/PVC) may be in the range of 0.04 to 0.32, in the range of 0.12 to 0.32, etc.

The coating layer composition may include HCl-reactive compound in an amount of 2.5 to 30.0 wt. %, the HCl-reactive compound consisting of $CaCO_3$ and/or wollastonite and polyvinyl chloride in an amount of 30 to 70 wt. %, based on the total weight of the coating layer composition, wherein a ratio of the amount of the HCl-reactive compound to the amount of the polyvinyl chloride (HCl-reactive compound/PVC) is in the range of 0.03 to 0.50. For example, a ratio of the amount of the HCl-reactive compound to the amount of the polyvinyl chloride (HCl-reactive compound/PVC) may be in the range of 0.08 to 0.37, in the range of 0.12 to 0.32, etc.

The HCl-reactive compound can have a particle size average $D50_{gls}$ (particle diameter at 50% of the cumulative distribution) determined by gravitational liquid sedimentation according to ISO 13317-3:2001-03 of in the range of 0.4 to 15.0 μm and/or a particle size average $D50_{ls}$ (particle diameter at 50% of the cumulative distribution) determined by laser scattering according to ISO 13320:2020 in the range of 0.4 to 30 μm.

The coating layer composition further includes 1 to 8 wt. % of a pigment, based on the total weight of the coating layer composition. For example, the coating layer composition may comprise a pigment in an amount in the range of 2 to 7 wt. %, in the range of 3 to 5 wt. %, etc., based on the total weight of the coating layer composition.

By adding the pigment to the coating layer light and weather fastness is improved.

The pigment may consist of a single type of pigment or may consist of a pigment composition comprising a combination of two or more types of pigments, for example in the form of powders or a pre-dispersed form, such as a master batch. In case a master batch is used this master batch may comprise PVC and plasticizer and may also include pre-dispersed HCl-reactive compound (e.g. $CaCO_3$), with the amounts of PVC, plasticizer, and HCl-reactive compound in the masterbatch being considered in determining the amounts of PVC, plasticizer, and HCl-reactive compound comprised in the coating layer composition, and with the K-value of the PVC of the coating layer composition being a mixed K-value as outlined above.

The pigment of the coating layer composition may be selected from the group consisting of pigments from group 3204 (organic pigments), such as pigments from group 3204.17, pigments from group 3206 (inorganic pigments), such as group 3206.11, group 3206.19, and group 3206.49, 3207, pigment 2803 (carbon black), pigment 2823 ($TiO_2$), frits, etc., (see "Harmonized Tariff Schedule of the United States Revision 10 (2025)").

The plasticizer, the HCl-reactive compound, and the pigment of the coating layer composition are also referred to as weathering stabilizers of the coating layer composition. Weathering stabilizers protect PVC from the effects of sunlight and water (water vapor), prevent damage to PVC, and bind damaged PVC into a non-porous matrix (with low refractive index difference).

Further additives that may be added to the weathering stabilizers may be phosphite esters, hindered polyols, polyols, such as hindered polyols, 1,3 diketones, and the like.

A coating layer composition as described above, i.e., coating layer composition comprising a polyvinyl chloride, a heat stabilizer, a plasticizer, a HCl-reactive compound, and a pigment as described above can be processed in an extrusion product comprising a substrate and a coating layer formed from the coating layer composition according to the present disclosure which exhibits a sufficient heat and UV light stability (as can be determined, e.g., by the QUV-STD test). However, there is potential for improvement in stability when exposed to water/water vapor (as can be determined, e.g., by the QUV-VSI test) and in processability in extrusion processing, such as co-extrusion processing. For example, the use of epoxidized vegetable oils (EVO) as plasticizers results in excellent QUV-STD weathering behavior, however, processability deteriorates (sticking of capstock to embossing rollers, imbalanced solidification speed of coating layer composition and substrate, imbalanced shrinkage or swelling, i.e., the reversal of molecular orientations and the relaxation of internal stresses that arise during the processing (extrusion) process of coating layer composition and substrate). Moreover, coating layer composition tends to exhibit a relatively high thermal expansion compared to a substrate as commonly applied in construction, such as a substrate comprising at least 70 wt. % of a further polyvinyl chloride, based on the total weight of the substrate, the further polyvinyl chloride having a K-value of 74 or less, such as a STD PVC substrate, typically in conjunction with a relatively low Vicat A softening temperature (VST). Moreover, a coating layer composition without filler tends to have a Vicat A softening temperature that is too low.

It is a finding of the present disclosure that these and other problems can be addressed by carefully selecting and a suitable filler.

The coating layer composition may further include 3 to 40 wt. % of a filler, based on the total weight of the coating layer composition. For example, the coating layer composition may comprise a filler in an amount in the range of 10 to 35 wt. %, in the range of 12 to 32 wt. %, etc., based on the total weight of the coating layer composition.

The filler may be selected from the group consisting of talc, mica, pyrophyllite, kaolin and mixtures thereof. For example, the filler may consist of talc, mica, pyrophyllite and/or kaolin. That is, the filler of the coating layer composition may be selected from the group consisting of talc, mica, kaolin and mixtures thereof, and is present in an amount of 100 wt. %, based on the total weight of the filler.

The filler may consist of a single type of filler (e.g., talc) or may consist of a filler composition comprising a combination of two or more types of filler (e.g., talc/mica, talc/pyrophyllite, talc/kaolin, kaolin/mica, kaolin/pyrophyllite, pyrophyllite/mica or talc/mica/kaolin, talc/mica/pyrophyllite, etc.) and/or a combination of different fillers of the same type (e.g., a combination of different talcs, a combination of different micas, a combination of different pyrophyllite, a combination of different kaolins, and mixtures thereof).

The filler may consist of talc. The filler may comprise a combination of talc and a further filler. The filler may comprise a combination of talc and mica and/or kaolin. It has been found that inferior weathering properties are may obtained when the filler comprises mica and/or kaolin without talc and/or pyrophyllite.

Moreover, the coating layer composition may not comprise any other fillers, in particular inorganic fillers, for example additional inorganic reinforcing agents, such as glass fiber. That is, the coating layer composition may comprise other fillers in an amount of less than 6 wt. %, less than 2.5 wt. %, less than 1.5 wt. %, based on the total amount of the coating layer composition, preferably does not comprise other fillers.

The refractive index of the filler may be in the range of 1.4 to 1.75, determined according to ASTM D 128:2021.

The whiteness of the filler may be in the range of 80 to 98, for example 85 to 94, determined according to DIN 53163: 2018-02.

The filler has a plate-shape. The term "plate-shape" may refer to a particle shape having a smaller thickness than a length and width thereof, also be referred to as scale, or flake.

The plate-shaped filler may have an aspect ratio $(D/T)_f$ of at least 3.0, for example at least 5.0, at least 10.0, etc. An aspect ratio $(D/T)_f$ of the plate-shaped filler may be determined as follows: aspect ratios $(D/T)_p$ of 50 particles of the plate-shaped filler is determined, with the aspect ratio $(D/T)_f$ of the plate-shaped filler being the average (arithmetic mean) of the aspect ratios $(D/T)_p$ of the 50 particles observed. An aspect ratio $(D/T)_p$ of a respective filler particle is obtained by determining a surface of the respective particle having the maximum area. The maximum length in a plan view of the surface having the maximum area is defined as the diameter D and the maximum thickness in a plan view perpendicular to the surface having the maximum area is defined as the thickness T. The particle diameter D can be determined by a particle size distribution measurement, for example, laser scattering (LS), dynamic light scattering (DLS), etc. The particle thickness T can be determined from an image of the particle, for example obtained by observation with a scan electron microscope (SEM). A related method for determining an aspect ratio of plate-shaped filler particles is described, for example in European patent application EP 4 129 908 A1, a content of which is herewith incorporated by reference.

The plate-shaped filler may have a "lamellarity index" LI of at least 1.5, for example a lamellarity index in the range of 1.5 to 5.0, in the range of 2.0 to 3.0, etc. The lamellarity index LI is defined as $(D50_{ls}/D50_{gls})$, in which $D50_{ls}$ is the particle size average (particle diameter at 50% of the cumulative distribution) determined by laser scattering according to ISO 13320:2020, for example using a MasterSizer of Malvern Panalytical Ltd, and $D50_{gls}$ is the particle size average (particle diameter at 50% of the cumulative distribution) determined by gravitational liquid sedimentation according to ISO 13317-3:2001-03, for example using a SediGraph of Malvern Panalytical Ltd.

The plate-shaped filler may have a particle size average $D50_{ls}$ (particle diameter at 50% of the cumulative distribution) determined by laser scattering according to ISO 13320:2020, for example using a MasterSizer of Malvern Panalytical Ltd in the range of 3 to 30 μm, in the range of 10 to 25 μm, in the range of 14 to 25 μm, etc.

The plate-shaped filler may have a particle size average $D50_{gls}$ (particle diameter at 50% of the cumulative distribution) determined by gravitational liquid sedimentation according to ISO 13317-3:2001-03, for example using a SediGraph of Malvern Panalytical Ltd in the range of 1 to 15 μm, in the range of 2 to 10 μm, in the range of 3 to 9 μm, etc.

In case the filler comprises a combination of two or more types of filler and/or a combination of two or more different fillers of the same type the above parameters "aspect ratio (D/T)", "$D50_{ls}$/$D50_{gls}$", "$D50_{ls}$" and "$D50_{gls}$" concern an average (arithmetic mean) of the two or more types of filler and/or the two or more fillers of the same type.

The term "talc" refers to magnesium silicate, chlorite (magnesium aluminiumsilicate), or mixtures thereof. The talc comprised in the filler of the coating layer composition is not particularly limited and can be selected according to needs. For example, suitable talc is described in the "Handbuch Kunststoff Additive" (Hanser Publishers, ISBN 978-3-446-43291-8, $4^{th}$ Edition 2016, Chapter 12 "Füllstoffe und Verstärkungsmittel" on page 1093 ff). For example, the talc may be Intalc ECO 20 of euroMinerals GmbH.

The term "mica" refers to a group of phyllosilicate silicate, such as muscovite, paragonite, margarite, biotite, leipidolite, etc. The mica comprised in the filler of the coating layer composition is not particularly limited and can be selected according to needs. For example, suitable mica is described in the "Handbuch Kunststoff Additive" (Hanser Publishers, ISBN 978-3-446-43291-8, $4^{th}$ Edition 2016, Chapter 12 "Füllstoffe und Verstärkungsmittel" on page 1095 ff). For example, the mica may be Aspanger MICA Large of Aspanger Bergbau und Mineralwerke GmbH & Co KG.

The term "kaolin" refers to phyllosilicates in the kaolinite-serpentine group, such as mullite. The kaolin comprised in the filler of the coating layer composition is not particularly limited and can be selected according to needs. For example, suitable kaolin is described in the "Handbuch Kunststoff Additive" (Hanser Publishers, ISBN 978-3-446-43291-8, $4^{th}$ Edition 2016, Chapter 12 "Füllstoffe und Verstärkungsmittel" on page 1095 ff).

The term "pyrophyllite" refers to phyllosilicate mineral composed of aluminium silicate hydroxide. The pyrophyllite comprised in the filler of the coating layer composition is not particularly limited and can be selected according to needs.

The coating layer composition may comprise a HCl-reactive compound in an amount of 2.5 to 30.0 wt. % and a filler in an amount of 3 to 40 wt. %, based on the total weight of the coating layer composition, and a ratio of the amount of the filler to the amount of the HCl-reactive compound (filler/HCl-reactive compound) may be in the range of 0.5 to 12.0, for example in the range of 0.5 to 8.0, in the range of 2 to 8, in the range of 1 to 8, in the range of 1 to 7, 1.0 to 5.5, 1 to 3, etc.

For example, the coating layer composition may include a HCl-reactive compound in an amount of 2.5 to 30.0 wt. %, the HCl-reactive compound comprising $CaCO_3$ and/or wollastonite, and a filler in an amount of 3 to 40 wt. %, the filler comprising talc and/or mica, based on the total weight of the coating layer composition, wherein a ratio of the amount of the filler to the amount of the HCl-reactive compound (filler/HCl-reactive compound) is in the range of 0.5 to 12. For example, the coating layer composition may include a HCl-reactive compound in an amount of 2.5 to 30.0 wt. %, the HCl-reactive compound consisting of $CaCO_3$ and/or wollastonite, and a filler in an amount of 3 to 40 wt. %, the filler consisting of talc and/or mica, based on the total weight of the coating layer composition, wherein a ratio of the amount of the filler to the amount of the HCl-reactive compound (filler/HCl-reactive compound) is in the range of 0.5 to 12.

For example, the coating layer composition may include a HCl-reactive compound in an amount of 2.5 to 30.0 wt. %, the HCl-reactive compound comprising of $CaCO_3$, and a filler in an amount of 3 to 40 wt. %, the filler comprising talc, based on the total weight of the coating layer composition, wherein a ratio of the amount of the talc to an amount of the $CaCO_3$ (talc/$CaCO_3$) is in the range of 0.5 to 8.0. For example, the coating layer composition may include a HCl-reactive compound in an amount of 2.5 to 30.0 wt. %, the HCl-reactive compound consisting of $CaCO_3$, and a filler in an amount of 3 to 40 wt. %, the filler consisting of talc, based on the total weight of the coating layer composition, wherein a ratio of the amount of the talc to the amount of the $CaCO_3$ (talc/$CaCO_3$) is in the range of 0.5 to 8.0.

For example, the coating layer composition may include a HCl-reactive compound in an amount of 2.5 to 30.0 wt. %, the HCl-reactive compound comprising $CaCO_3$, and a filler in an amount of 3 to 40 wt. %, the filler comprising a mixture of talc and mica, based on the total weight of the coating layer composition, wherein a ratio of the amount of the talc to the amount of the $CaCO_3$ (talc/$CaCO_3$) is in the range of 0.5 to 8.0, and wherein ratio of the amount of the talc to the amount of the mica (talc/mica) is in the range of 2 to 8. For example, the coating layer composition may include a HCl-reactive compound in an amount of 2.5 to 30.0 wt. %, the HCl-reactive compound consisting of $CaCO_3$, and a filler in an amount of 3 to 40 wt. %, the filler consisting of a mixture of talc and mica, based on the total weight of the coating layer composition, wherein a ratio of the amount of the talc to the amount of the $CaCO_3$ (talc/$CaCO_3$) is in the range of 0.5 to 8.0, and wherein ratio of the amount of the talc to the amount of the mica (talc/mica) is in the range of 2 to 8.

For example, the coating layer composition may include a HCl-reactive compound in an amount of 2.5 to 30.0 wt. %, the HCl-reactive compound comprising a mixture of $CaCO_3$ and wollastonite, and a filler in an amount of 3 to 40 wt. %, the filler comprising a mixture of talc and mica, based on the total weight of the coating layer composition, wherein a ratio of the amount of the talc to the amount of the $CaCO_3$ (talc/$CaCO_3$) is in the range of 0.5 to 8.0, for example at 1.0 to 4.0 or 2.0 to 3.0, wherein a ratio of the amount of the talc to the amount of the mica (talc/mica) is in the range of 2 to 8, for example at 3.0 to 6.0 or 4.0 to 5.0, and wherein a ratio of the amount of the talc to the amount of the wollastonite (talc/wollastonite) is in the range of 1.0 to 8.0, for example at 3.0 to 6.0 or 4.0 to 5.0. For example, the coating layer composition may include a HCl-reactive compound in an amount in the range of 2.5 to 30.0 wt. %, the HCl-reactive compound consisting of a mixture of $CaCO_3$ and wollastonite, and a filler in an amount in the range of 3 to 40 wt. %, the filler consisting of a mixture of talc and mica, based on the total weight of the coating layer composition, wherein a ratio of the amount of the talc to the amount of the $CaCO_3$ (talc/$CaCO_3$) is in the range of 0.5 to 8.0, wherein a ratio of the amount of the talc to the amount of the mica (talc/mica) is in the range of 2 to 8, and wherein a ratio of the amount of the talc to the amount of the wollastonite (talc/wollastonite) is in the range of 1.0 to 8.0.

The coating layer composition may include filler in an amount in the range of 3 to 40 wt. %, the filler comprising talc, mica, pyrophyllite and/or kaolin and polyvinyl chloride in an amount of 30 to 70 wt. %, based on the total weight of the coating layer composition, wherein a ratio of the amount of the filler to the amount of the polyvinyl chloride (filler/PVC) is in the range of 0.05 to 0.85. For example, a ratio of the amount of the filler to the amount of the polyvinyl chloride (filler/PVC) may be in the range of 0.1 to 0.8, in the range of 0.2 to 0.7, etc.

The coating layer composition may include filler in an amount in the range of 3 to 40 wt. %, the filler consisting of talc and/or mica, and polyvinyl chloride in an amount of 30 to 70 wt. %, based on the total weight of the coating layer composition, wherein a ratio of the amount of the filler to the amount of the polyvinyl chloride (filler/PVC) is in the range of 0.05 to 0.85. For example, a ratio of the amount of the filler to the amount of the polyvinyl chloride (filler/PVC) may be in the range of 0.1 to 0.8, in the range of 0.2 to 0.7, etc.

It is a finding of the present disclosure that use of the HCl-reactive compound (e.g., $CaCO_3$) without filler is disadvantageous, since extrusion products obtained from respective coating layer compositions and substrate compositions show undesirable properties, for example imbalanced solidification speed of coating layer composition and substrate composition, imbalanced shrinkage or swelling of coating layer composition and substrate composition, low VST, etc.

It is a finding of the present disclosure that the use of $CaCO_3$ as HCl-reactive compound without filler is disadvantageous, since the extrusion products obtained from respective coating layer compositions show undesirable properties, for example inferior stability when exposed to water/water vapor (as can be determined, e.g., by the QUV-VSI test).

It is a finding of the present disclosure that use of the filler (e.g., talc) without HCl-reactive compound is disadvantageous, since extrusion products obtained from respective coating layer compositions show undesirable properties, for example inferior weathering results due to chalking (fading) occur from approx. 7000 h onwards, observed, e.g., in the QUV-STD test. In other words, samples obtained from the coating layer composition still show excellent ΔE-values at 6000 h in the QUV-STD test and at 7000 h in the QUV-STD test ΔE-values suddenly increase significantly, e.g. to ΔE-values of 8 or higher.

It is a finding of the present disclosure that the use of filler comprising talc improves both processing properties of the coating layer composition, for example increased melt volume-flow rate (MVR), and also properties of extrusion products obtained therefrom, for example improved weathering stability when exposed to water/water vapor (as can be determined, e.g., by the QUV-VSI test).

The coating layer composition may include a filler comprising talc in an amount of at least 50 wt. %, based on the total weight of the filler. For example, the coating layer composition may include a filler comprising talc in an amount of at least 60 wt. %, at least 70 wt. %, at least 80 wt. %, at least 90 wt. %, etc., based on the total weight of the filler. For example, the filler may comprise 100 wt. % talc, based on the total weight of the filler. In other words, the filler may consist of talc.

The coating layer composition may include a filler comprising pyrophyllite in an amount of at least 50 wt. %, based on the total weight of the filler. For example, the coating layer composition may include a filler comprising pyrophyllite in an amount of at least 60 wt. %, at least 70 wt. %, at least 80 wt. %, at least 90 wt. %, etc., based on the total weight of the filler. For example, the filler may comprise 100 wt. % pyrophyllite, based on the total weight of the filler. In other words, the filler may consist of pyrophyllite.

The coating layer composition may include a filler comprising a mixture of talc and pyrophyllite in an amount of at least 50 wt. %, based on the total weight of the filler. For example, the coating layer composition may include a filler comprising a mixture of talc and pyrophyllite in an amount of at least 60 wt. %, at least 70 wt. %, at least 80 wt. %, at least 90 wt. %, etc., based on the total weight of the filler. For example, the filler may comprise 100 wt. % of a mixture of talc and pyrophyllite, based on the total weight of the filler. In other words, the filler may consist of a mixture of talc and pyrophyllite.

It is a finding of the present disclosure that the use of a filler having a plate-shape in the coating layer composition significantly improves a weathering stability when exposed to water/water vapor (as can be determined, e.g., by the QUV-VSI test) of extrusion products obtained therefrom.

It is a finding of the present disclosure that the use of a HCl-reactive compound comprising wollastonite can fulfill a double function both as HCl-reactive compound and as filler.

In this respect, it has also been found that the use of a HCl-reactive compound comprising wollastonite without filler results in inferior processability, for example sticking of coating layer composition (capstock) to embossing rollers, imbalanced shrinkage or swelling, imbalanced solidification speed of coating layer composition and substrate composition, etc. Furthermore, the properties of the extrusion product, such as VST and QUV-VSI, are not sufficient.

For example, the coating layer composition may include a HCl-reactive compound in an amount of 2.5 to 30.0 wt. %, the HCl-reactive compound comprising wollastonite, and a filler in an amount of 3 to 40 wt. %, the filler comprising talc and/or mica, based on the total weight of the coating layer composition, wherein a ratio of the amount of the filler to the amount of the wollastonite (filler/wollastonite) is in the range of 1.0 to 8.0. For example, the coating layer composition may include a HCl-reactive compound in an amount of 2.5 to 30.0 wt. %, the HCl-reactive compound consisting of wollastonite, and a filler in an amount of 3 to 40 wt. %, the filler consisting of talc and/or mica, based on the total weight of the coating layer composition, wherein a ratio of the amount of the filler to the amount of the wollastonite (filler/wollastonite) is in the range of 1.0 to 8.0.

The coating layer composition may further comprise an acrylic polymer in an amount of less than 30 wt. %, based on the total weight of the coating layer composition. For example, the coating layer composition may comprise an acrylic polymer in an amount of less than 30 wt. %, in an amount of less than 23 wt. %, in an amount of less than 15 wt. %, in an amount in the range of 1 to 30 wt. %, in an amount in the range of 5 to 23 wt. %, in an amount in the range of 10 to 15 wt. %, etc., based on the total weight of the coating layer composition.

The acrylic polymer may be selected from the group consisting of acrylonitrile styrene acrylate (ASA), polymethylmethacrylate (PMMA), and mixtures thereof. Suitable acrylonitrile styrene acrylates (ASA) are, for example, Luran S 797SE and Luran S 778TE from INEOS Styrolution Europe GmbH. A suitable polymethylmethacrylate (PMMA) is, for example, LG IF 850 from Southland Polymers Inc.

It is a finding of the present disclosure that the presence of acrylic polymer in combination with a plasticizer selected from the group consisting of epoxidized vegetable oils (EVO), epoxidized fatty acids, epoxidized fatty acid esters, and mixtures thereof, may improve a weathering stability of the coating layer composition (and extrusion products obtained therefrom), as can be assessed, for example, from artificial weathering in the QUV-STD test and the QUV-VSI test.

The acrylic polymer may consist of a single type of acrylic polymer (e.g., acrylonitrile styrene acrylate) or may consist of a composition comprising a combination of two or more types of acrylic polymers (e.g., acrylonitrile styrene acrylate/polymethylmethacrylate) and/or a combination of different acrylic polymers of the same type (e.g., a combination of different acrylonitrile styrene acrylates, a combination of different polymethylmethacrylates, etc., and mixtures thereof).

However, acrylic polymers tend to be brittle and may not show the required impact strength, the impact strength under plain strain conditions being a reliable indicator of brittleness for a given formulation, following a linear elastic fracture mechanism on pressed plates, determined the single V-notch impact test according to ISO 179-1/1eA, where a calendared/pressed test specimen is subjected to a minimum energy of 20 kJ/m$^2$.

The coating layer composition may further comprise impact modifier in an amount of less than 20 wt. %, based on the total weight of the coating layer composition. For example, the coating layer composition may comprise impact modifier in an amount of less than 15 wt. %, in an amount of less than 10 wt. %, in an amount in the range of 1 to 20 wt. %, in an amount in the range of 2 to 15 wt. %, in an amount in the range of 4 to 10 wt. %, etc., based on the total weight of the coating layer composition.

The impact modifier comprised in the coating layer composition is not particularly limited and can be selected according to needs. For example, suitable impact modifiers are described in the "PVC Handbook" (Hanser Publishers, ISBN 978-3-446-22714-9, 1$^{st}$ Edition 2005, Chapter 6 "Processing Aids and Impact Modifiers" on page 212 ff). For example, the impact modifier may be selected from the group consisting of an acrylic-impact-modifier with a core-shell structure (AIM), a copolymer of vinylchloride and acrylic ester rubber (VC/ACR), a copolymer of ethylene and methyl acrylate (EMA), a copolymer of ethylene and ethyl acrylate (EEA), a copolymer of ethylene and butyl acrylate (EBA), and mixtures thereof. Suitable acrylic-impact-modifiers with a core-shell structure (AIM) are, for example, Paraloid KM-335 and Paraloid KM-1 from Dow Inc., KaneAce FM56 from Kaneka Belgium N.V., Durastrenth 365 from Arkema Inc. Suitable copolymers of vinylchloride and acrylic ester rubber (VC/ACR) are, for example, Vinnolit K 707 E, Vinnolit VK-710, and Vinnolit K 725 F from Vinnolit GmbH & Co. KG. Suitable copolymers of ethylene and methyl acrylate (EMA) are, for example Elvaloy AC 1218 and Elvaloy AC1224 from Dow Inc. A suitable copolymer of ethylene and ethyl acrylate (EEA) is, for example, Elvaloy AC 2116 from Dow Inc. A suitable copolymer of ethylene and butyl acrylate (EBA) is, for example, Elvaloy AC 3737 from Dow Inc.

It is a finding of the present disclosure that the presence of an impact modifier may improve a long-term stability of the coating layer composition (and extrusion products obtained therefrom) by counteracting an increasing brittleness occurring over time as a result of plasticizer migration. Moreover, it is a finding of the present disclosure that the presence of an acrylic impact modifier in combination with a plasticizer selected from the group consisting of epoxidized vegetable oils (EVO), epoxidized fatty acids, epoxidized fatty acid esters, and mixtures thereof, may improve a weathering stability of the coating layer composition (and extrusion products obtained therefrom), as can be assessed, for example, from artificial weathering in the QUV-STD test and the QUV-VSI test. In this respect, without any intention to be bound by theory, it is suspected that the acrylic impact modifiers may partially react with the epoxidized plasticizer forming weather resistance acrylate-plasticizer compound resulting in improved QUV-STD test results.

Preferably weathering-labile impact modifiers, such as methyl methacrylate-butadiene-styrene polymers (MBS), acylonitrile-butadiene-styrene polymers (ABS), chlorinated polyethylene (CPE), and ethylene copolymers such as ethylene-vinyl-acetate (EVA), are not comprised in the coating layer composition.

The impact modifier may consist of a single type of impact modifier (e.g., acrylic-impact-modifier with a core-shell structure) or may consist of an impact modifier composition comprising a combination of two or more types of impact modifiers (e.g., acrylic-impact-modifier with a core-shell structure/copolymer of vinylchloride and acrylic ester rubber) and/or a combination of different acrylic polymers of the same type (e.g., a combination of different acrylic-impact-modifiers with a core-shell structure, a combination of different copolymers of vinylchloride and acrylic ester rubber, etc., and mixtures thereof).

The coating layer composition may include impact modifier in an amount of less than 20 wt. % and a polyvinyl chloride in an amount of 30 to 70 wt. %, based on the total weight of the coating layer composition, wherein a ratio of the amount of the impact modifier to the amount of the polyvinyl chloride (impact modifier/PVC) is in the range of 0 to 0.48. For example, a ratio of the amount of the impact modifier to the amount of the polyvinyl chloride (impact modifier/PVC) may be in the range of 0.05 to 0.45, in the range of 0.08 to 0.30, etc.

The coating layer composition may further comprise lubricant in an amount of less than 2 wt. %, based on the total weight of the coating layer composition. For example, the coating layer composition may comprise lubricant in an amount of less than 1 wt. %, in an amount of less than 0.6 wt. %, in an amount in the range of 0.05 to 2.00 wt. %, in an amount in the range of 0.1 to 1.0 wt. %, in an amount in the range of 0.2 to 0.6 wt. %, etc., based on the total weight of the coating layer composition.

The lubricant comprised in the coating layer composition is not particularly limited and can be selected according to needs. For example, suitable lubricants are described in the "PVC Handbook" (Hanser Publishers, ISBN 978-3-446-22714-9, 1$^{st}$ Edition 2005, Chapter 4 "PVC Stabilizers and Lubricants" on page 129 ff), a content of which is herewith incorporated by reference. For example, the lubricant may be selected from the group consisting of petroleum waxes, synthetic hydrocarbon waxes, mineral waxes, natural triglycerides, and mixtures thereof.

The lubricant comprised in the coating layer composition may be an oxidized low density polyethylene wax having an acid number of 14 to 17 mg KOH/g, determined according to ASTM D664-24. A suitable lubricant is for example Viscowax 253 from Innospec Leuna GmbH.

The lubricant may consist of a single type of lubricant (e.g., petroleum wax) or may consist of a lubricant composition comprising a combination of two or more types of lubricants (e.g., petroleum wax/synthetic hydrocarbon wax, petroleum wax/mineral wax, etc.) and/or a combination of different lubricants of the same type (e.g., a combination of different petroleum waxes, a combination of different synthetic hydrocarbon waxes, etc., and mixtures thereof).

The coating layer composition may further comprise fungicide in an amount of less than 0.2 wt. %, based on the total weight of the coating layer composition. For example, the coating layer composition may comprise fungicide in an amount of less than 0.15 wt. %, in an amount of less than 0.12 wt. %, in an amount in the range of 0.01 to 0.15 wt. %, in an amount in the range of 0.08 to 0.12 wt. %, etc., based on the total weight of the coating layer composition.

The fungicide comprised in the coating layer composition is not particularly limited and can be selected according to needs. For example, the fungicide may be selected from the group consisting of DMI-fungicides, QoI-fungicides, dithiocarbamates, MBC-fungicides, MBC-fungicides, AP-fungicides, arsenic-fungicides, thiazolinone-fungicides, zinc-fungicides, and mixtures thereof. For example, the fungicide may be selected from the group consisting of 10,10'-oxybisphenoxarsine (OBPA), 2-octyl-4-isothiazol-3(2H)-one (OIT), 4,5-dichloro-2-octyl-1,2-thiazol-3(2H)-one (DCOIT), bis(2-pyridylthio)zinc 1,1'-dioxide (INN), and mixtures thereof.

The presence of fungicide in the coating layer composition may for example help to prevent the plasticizer from being metabolized by microorganisms and fungi.

The fungicide may consist of a single type of fungicide (e.g., thiazolinone-fungicide) or may consist of a fungicide composition comprising a combination of two or more types of fungicides (e.g., thiazolinone-fungicide/arsenic-fungicide, etc.) and/or a combination of different fungicides of the same type (e.g., 2-octyl-4-isothiazol-3(2H)-one/5-dichloro-2-octyl-1,2-thiazol-3(2H)-one).

The coating layer composition may further comprise processing aid in an amount of less than 4 wt. %, based on the total weight of the coating layer composition. For example, the coating layer composition may comprise processing aid in an amount of less than 3 wt. %, in an amount of less than 1.5 wt. %, etc., based on the total weight of the coating layer composition.

The processing aid comprised in the coating layer composition is not particularly limited and can be selected according to needs. For example, suitable processing aids are described in the "PVC Handbook" (Hanser Publishers, ISBN 978-3-446-22714-9, $1^{st}$ Edition 2005, Chapter 6 "Processing Aids and Impact Modifiers" on page 201 ff), a content of which is herein incorporated by reference.

The processing aid comprised in the coating layer composition may be selected from the group consisting of CAS 37953-21-2, CAS 25852-37-3, CAS 25608-33-7, and mixtures thereof.

The processing aids can be added to the coating layer composition, for example, to improve a melting behavior, i.e., melt homogeneity, melt strength, melt viscosity, etc.

The coating layer composition may comprise further additives in an amount of less than 5 wt. %, based on the total weight of the coating layer composition. For example, the coating layer composition may comprise further additives in an amount of less than 4 wt. %, in an amount of less than 3 wt. %, in an amount of less than 2 wt. %, in an amount of less than 1 wt. %, in an amount of less than 0.5 wt. %, based on the total weight of the coating layer composition.

The further additives comprised in the coating layer composition are not particularly limited and can be selected according to needs. For example, suitable additives are described in "PVC Additives" (Hanser Publishers, ISBN 978-1-56990-871-6, $2^{nd}$ Edition 2022), a content of which is herewith incorporated by reference.

As outlined above, it is a finding of the present disclosure that the use of a HCl-reactive compound comprising wollastonite can fulfill a double function both as HCl-reactive compound and as filler. In this respect, the present disclosure is further directed at a coating layer composition comprising: 30 to 70 wt. % of a polyvinyl chloride, 1 to 5 wt. % of a heat stabilizer; 8 to 24 wt. % of a plasticizer; 2.5 to 30.0 wt. % of a HCl-reactive compound, 1 to 40 wt. % of a filler; and 1 to 8 wt. % of a pigment, based on the total weight of the coating layer composition, wherein the polyvinyl chloride has a K-value in the range of 75 to 100, wherein the HCl-reactive compound is selected from the group consisting of $CaCO_3$, hydrotalcite, zeolite, hydrocalumite, hydroxides of magnesium, hydroxides of aluminum, wollastonite, and mixtures thereof, wherein the filler is selected from the group consisting of talc, mica, pyrophyllite, kaolin and mixtures thereof, and wherein the filler has a plate-shape.

The coating layer composition being defined as outlined above in conjunction with the first aspect of the present disclosure, with the proviso that the amount of filler in the coating layer composition is in a range of 1 to 40 wt. %, based on the total weight of the coating layer composition.

In case the coating layer composition comprises 0 wt. % filler, the HCl reactive compound consists of wollastonite or comprises a mixture of wollastonite and at least one of $CaCO_3$, hydrotalcite, zeolite, hydrocalumite, hydroxides of magnesium, and hydroxides of aluminum, preferably a mixture of wollastonite and $CaCO_3$. The mixture may comprise at least 50 wt. % wollastonite, at least 60 wt. % wollastonite, at least 70 wt. % wollastonite, at least 80 wt. % wollastonite, at least 90 wt. % wollastonite, etc., based on the total weight of the HCl reactive compound. For example, the HCl reactive compound may consist of a mixture of wollastonite and $CaCO_3$. For example, the HCl reactive compound may consist of wollastonite. Moreover, the wollastonite comprised in the HCl-reactive compound have a "lamellarity index" LI of at least 1.5, for example a lamellarity index in the range of 1.5 to 5.0, in the range of 2.0 to 3.0, etc. The lamellarity index LI is defined as $(D50_{ls}/D50_{gls})$, in which $D50_{ls}$ is the particle size average (particle diameter at 50% of the cumulative distribution) determined by laser scattering according to ISO 13320:2020, for example using a MasterSizer of Malvern Panalytical Ltd, and $D50_{gls}$ is the particle size average (particle diameter at 50% of the cumulative distribution) determined by gravitational liquid sedimentation according to ISO 13317-3:2001-03, for example using a SediGraph of Malvern Panalytical Ltd.

The present disclosure is further directed to an extrusion product comprising a substrate and a coating layer, wherein the coating layer comprises a coating layer composition described above, and wherein the substrate comprises at least 60 wt. % of a further polyvinyl chloride, based on the total weight of the substrate, the further polyvinyl chloride having a K-value of 74 or less.

For example, the substrate may comprise the further polyvinyl chloride in an amount of at least 60 wt. %, of at least 70 wt. %, of at least 75 wt. %, in the range of 50 to 100 wt. %, in the range of 60 to 90 wt. %, in the range of 70 to 85 wt. %, in the range of 75 to 80 wt. %, etc., based on the total weight of the substrate. For example, the further polyvinyl chloride may have a K-value of 72 or less, of 70 or less, of 68 or less, in the range of 50 to 74, in the range of 50 to 72, in the range of 50 to 70, etc.

The coating layer of the extrusion product may consist of the coating layer composition according to the present disclosure as described in detail above and the substrate may comprise no other polymeric compounds besides the further polyvinyl chloride having a K-value of 74 or less.

The substrate may comprise (i) at least 60 wt. % of the further polyvinyl chloride, (ii) 0.4 to 4 wt. % heat stabilizer, (iii) less than 2 wt. % plasticizer, (iv) 4 to 30 wt. % HCl-reactive compound, (v) less than 1.5 wt. % pigment, (vi) 2 to 10 wt. % impact modifier, and (vii) 0.1 to 2 wt. % lubricant, based on the total weight of the substrate, wherein the further polyvinyl chloride has a K-value in the range of 58 to 74, with the heat stabilizer, the plasticizer, the HCl-reactive compound, the pigment, the impact modifier, and the lubricant being defined as outlined above in conjunction with the coating layer composition according to the present disclosure. Moreover, the further polyvinyl chloride may be U-PVC, the HCl-reactive compound may be stearin coated $CaCO_3$ having a particle size average $D50_{gls}$ (particle diameter at 50% of the cumulative distribution) in the range of 0.5 to 2.5 µm, determined by gravitational liquid sedimentation according to ISO 13317-3:2001-03, for example using a SediGraph of Malvern Panalytical Ltd, and the plasticizer may be epoxidized vegetable oil (EVO).

As used herein, the term "U-PVC" refers to an amorphous thermoplastic polyvinyl chloride with only a small amount of plasticizer, e.g., amorphous thermoplastic polyvinyl chloride free of plasticizer.

The substrate may comprise (i) at least 60 wt. % of the further polyvinyl chloride, (ii) 0.4 to 4 wt. % heat stabilizer, (iii) less than 2 wt. % plasticizer, (iv) 0 to 20 wt. % HCl-reactive compound, (v) 4 to 30 wt. % filler, (vi) less than 1.5 wt. % pigment, (vii) 0.5 to 12 wt. % impact modifier, and (viii) 0.2 to 2 wt. % lubricant, based on the total weight of the substrate, wherein the further polyvinyl chloride has a K-value in the range of 58 to 74, with the heat stabilizer, the plasticizer, the HCl-reactive compound, the filler, the pigment, the impact modifier, and the lubricant being defined as outlined above in conjunction with the coating layer composition according to the present disclosure. Moreover, the further polyvinyl chloride may be a U-PVC, the HCl-reactive compound may be stearin coated $CaCO_3$ having a particle size average $D50_{gls}$ (particle diameter at 50% of the cumulative distribution) in the range of 0.5 to 2.5 µm, determined by gravitational liquid sedimentation according to ISO 13317-3:2001-03, for example using a SediGraph of Malvern Panalytical Ltd, and the plasticizer may be epoxidized vegetable oil (EVO).

Moreover, the substrate may comprise 0.1 to 25.0 wt. % of filler or wollastonite, wherein filler and wollastonite are defined as described above.

As used herein, the term "extrusion product" refers to a product obtained by extrusion, with extrusion relating to a process used to create objects of a fixed cross-sectional profile by pushing material through a die of the desired cross-section. Preferably the extrusion product is obtained by plastics extrusion, i.e., a high-volume manufacturing process in which plastic raw material is melted and formed into a continuous profile. An according process typically starts by feeding raw material (pellets, granules, flakes and/or powders) from a hopper into a barrel of an extruder, where the material is gradually melted by mechanical energy generated by turning one or more screws and by one or more heaters arranged along the barrel. The molten raw material is then forced into a die, which determines the shape of the extrusion product that hardens during cooling, for example in water. Furter details on extrusion processing are described for example in "Polymer Extrusion" (Hanser Publishers, ISBN 978-1-56990-917-1, $1^{st}$ Edition 2024, Chapters 6 "Single-Screw Extrusion" and Chapter 7 "Dynamic Processing Characteristics of Co-Rotating Twin-Screw Extrusion by Visualization" on page 107 ff), a content of which is herewith incorporated by reference.

The extrusion product may be obtained by co-extrusion. That is, the extrusion product may be a co-extrusion product. As used herein, the term "co-extrusion product" refers to a product obtained by a co-extrusion process, wherein multiple layers of material are extruded simultaneously. Typically, this type of extrusion utilizes two or more extruders to melt and deliver a steady volumetric throughput of different viscous plastics to a single extrusion head (die) which will extrude the materials in the desired form. For example, the substrate raw material and the coating layer composition raw material may be subjected to a co-extrusion process.

The coating layer of the extrusion product, for example the co-extrusion product, may have a thickness in the range of 40 to 400 µm. For example, the coating layer of the extrusion product may have a thickness in the range of 50 to 300 µm, in the range of 60 to 250 µm, etc.

The extrusion product, for example the co-extrusion product, may be an extrusion product commonly used in construction. For example, the extrusion product may be a siding product, a window profile, a decking profile, a rainwater gutter, a fence, or the like.

The substrate of the co-extrusion product may have a thickness in the range of 300 to 4000 µm. For example, the substrate of the co-extrusion product may have a thickness in the range of 600 to 3000 µm, in the range of 900 to 2000 µm, etc.

Between the coating layer and substrate of a co-extrusion product there is a transition layer up to 10 µm thick, which has a mixed composition of coating layer composition and substrate composition. For example, the transition layer of the co-extrusion product may have a thickness in the range of 0.3 to 8 µm, in the range of 0.5 to 1 µm, etc.

The present disclosure is further directed to a process for the preparation of an extrusion product comprising the steps of: providing the coating layer composition according to the present disclosure as described in detail above; providing a substrate composition comprising at least 60 wt. % of a further polyvinyl chloride, based on the total weight of the substrate, the further polyvinyl chloride having a K-value of 74 or less; feeding each of the coating layer composition and the substrate composition to an extruder, and extruding the coating layer composition and the substrate composition to obtain the extrusion product according to the present disclosure described above.

Having generally described this disclosure, a further understanding can be obtained by reference to certain specific examples illustrated below which are provided for purposes of illustration only and are not intended to be all inclusive or limiting unless otherwise specified.

EXAMPLES

The examples E1 to E15, as well as the comparative examples C1 to C8 have been prepared by hot blending the components of Table 1 at 110° C. with a Thermomix TM31 from Vorwerk Deutschland Stiftung & Co. KG. Subsequently the hot blended components have been calendared with a Polymix 110L from Servitec Maschinenservice GmbH for 2 minutes at 180° C. Several layers of the calendared film where hot pressed at 190° C. with a Collin Presse 200 from Dr. Collin GmbH. The pressed plates have been evaluated as described below in more detail.

The melt volume-flow rate MVR [$cm^3$/10 min] has been determined according to DIN EN ISO 11 33-1:2022-10 (356° F., 50 kg, DIE 5).

The Vicat A Softening Temperature (VST) has been determined according to ASTM D 1525 (starting temp. 73° F., heat-up rate 50 K/h, holding time 5 min).

The QUV-STD has been determined according to ISO-4892-3 (8 h UVA (340 nm) at 140° F., 4 h condensation at 122° F., ΔE 6000 h).

The QUV-VSI has been determined according to ASTM G154 (12 h UVA (340 nm) at 122° F., 12 h condensation at 140° F., ΔE 3000 h).

The color deviation ΔE 3000 h and ΔE 6000 according to L*a*b has been determined after artificial weathering using spectral photometer CM-36dGV from Konika Minolta using 45/0 measuring geometry.

The thermal expansion ΔL (68-176° F.) has been determined according to DIN 53752, ISO11359-1, -2 using thermomechanical analyzer TMA 60 from Shimadzu Scientific Instruments.

The oxirane oxygen has been determined according to ASTM D 1652-97.

The iodine value has been determined according to ASTM D 5768-02 (2022).

The whiteness has been determined according to DIN 53163:2018-02.

The refractive index has been determined according to ASTM D 1218-12

The acid number has been determined according to ASTM D664-24.

26

K-80 Vinnolit S 4080 from Vinnolit GmbH & Co. KG (PVC)
K-84 LG PVC LS 300 from LG Chem Ltd. (PVC)
K-90 PVC S 9060 from Inovyn Deutschland GmbH (PVC)
K-100 Vinnolit S 100 from Vinnolit GmbH & Co. KG (PVC)
HS Baerostab MC 8763-1 CP from Baerlocher GmbH (Ca/Zn Heat Stab.)
LUB Viscowax 253 from Innospec Leuna GmbH (Oxidised PE Wax Lubricant)
PL Edenol D81 from Emery Oleochemicals GmbH (Di-(2-Butoxy Triglycol)-Adipate Plasticizer)
PHT Palatinol N (DIDP) from BASF SE (Phthalate Plasticizer)
IM1 Vinnolit VK-710 from Vinnolit GmbH & Co. KG (PVC-ACR Thermoplastic Elastomer Impact Modifier)
IM2 Elvaloy AC 1224 from Dow Inc. (Acrylate Copolymer Impact Modifier)
HC1 Microcarb WM 1T from Reverté Productos Minerales S.A. ($CaCO_3$ HCl-RC)
HC2 Wollastonite Casiflux FG20 from SCR—Sibelco N.V. (Wollastonite Powder HCl-RC)
F1 Intalc ECO 20 from euroMinerals GmbH (Microcrystalline Talc Filler)
F2 Aspanger Mica Large from Aspanger Bergbau und Mineralwerke GmbH & Co KG (Mica Filler)
PI Powder Pigment Mixture: P·Br29 (50 wt. %), PR 101 (10 wt. %), PG17 (10 wt. %), PW 6 (30 wt. %), based on the total weight of the mixture
MVR melt volume-flow rate [$cm^3$/10 min]
VST Vicat A Softening Temperature [° C.]
ΔE6K QUV-STD/ΔE 6000 h
ΔE3K QUV-VSI/ΔE 3000 h

TABLE 1

| | | PVC | HS | LUB | PL | PHT | IM1 | IM2 | HC1 | HC2 | F1 | F2 | PI | MVR | VST | ΔL | ΔE6K | ΔE3K |
|---|---|---|---|---|---|---|---|---|---|---|---|---|---|---|---|---|---|---|
| E1 | K-75 | 47.95 | 2.10 | 0.48 | 13.7 | 0.67 | 8.0 | | 9.7 | | 13.4 | | 4.0 | 80 | 76 | | 1.2 | 1.1 |
| E2 | K-80 | 47.51 | 2.54 | 0.48 | 13.7 | 0.77 | 7.7 | | 9.6 | | 13.7 | | 4.0 | 51 | 87 | | 1.3 | 0.9 |
| E3 | K-80 | 47.01 | 2.54 | 0.48 | 13.7 | 0.77 | 8.2 | | 4.8 | | 18.5 | | 4.0 | 46 | 91.5 | | 3.2 | 0.6 |
| E4 | K-80 | 47.01 | 2.21 | 0.48 | 13.6 | | 8.6 | | 4.8 | | 19.3 | | 4.0 | 33 | 91 | | 3.4 | 0.6 |
| E5 | K-84 | 46.52 | 2.10 | 0.48 | 15.0 | | 5.1 | 3.8 | 9.6 | | 13.4 | | 4.0 | 50 | 89 | | 1.1 | 0.9 |
| E6 | K-84 | 46.11 | 2.21 | 0.48 | 13.4 | | 3.6 | | 2.9 | | 19.2 | 3.1 | 4.0 | 28 | 95 | | 3.5 | 0.6 |
| E7 | K-84 | 45.21 | 2.21 | 0.48 | 13.8 | | 8.6 | | 4.0 | | 21.7 | | 4.0 | 30 | 97 | | 2.9 | 0.6 |
| E8 | K-84 | 38.41 | 2.21 | 0.48 | 12.7 | | 9.6 | | 6.7 | | 25.9 | | 4.0 | 35 | 97 | 0.50 | 2.3 | 0.6 |
| E9 | K-90 | 43.21 | 2.21 | 0.48 | 12.7 | | 8.6 | | | 12.5 | 16.3 | | 4.0 | 40 | 93 | | 1.2 | 1.1 |
| E10 | K-90 | 43.21 | 2.21 | 0.48 | 12.7 | | 8.6 | | 12.5 | | 16.3 | | 4.0 | 42 | 96 | | 1.2 | 0.7 |
| E11 | K-90 | 47.72 | 2.21 | 0.48 | 14.59 | | 3.8 | | 4.8 | | 18.6 | 3.8 | 4.0 | 36 | 101 | 0.51 | 2.4 | 0.6 |
| E12 | K-90 | 47.96 | 2.21 | 0.48 | 15.35 | | 3.8 | | 6.1 | | 16.3 | 3.8 | 4.0 | 43 | 102 | 0.56 | 2.2 | 0.6 |
| E13 | K-100 | 44.43 | 2.21 | 0.48 | 14.39 | | 3.8 | | 14.39 | | 11.5 | 4.8 | 4.0 | 23 | 93 | 0.57 | 1.1 | 0.8 |
| E14 | K-100 | 49.01 | 2.21 | 0.48 | 16.31 | | | | 7.39 | | 14.4 | 6.2 | 4.0 | 45 | 101 | 0.47 | 2.3 | 0.5 |
| E15 | K-90 | 47.95 | 2.21 | 0.48 | 15.35 | | 3.8 | | 2.9 | 3.8 | 16.3 | 3.3 | 4.0 | 40 | 98 | 0.32 | 1.9 | 0.6 |
| C1 | K-67 | 78.71 | 2.21 | 0.48 | | | 5.0 | | 9.60 | | | | 4.0 | 25 | 85 | 0.53 | 8.2 | 6.7 |
| C2 | K-90 | 43.21 | 2.21 | 0.48 | 12.7 | | 8.6 | | | | 28.8 | | 4.0 | 32 | 96 | | 6.8 | 0.5 |
| C3 | K-70 | 47.15 | 2.21 | 0.48 | 13.4 | 0.58 | 8.9 | | 9.88 | | 13.4 | | 4.0 | 130 | 74 | 0.70 | 1.8 | 1.2 |
| C4 | K-70 | 46.61 | 2.11 | 0.48 | 14.2 | | | 10.1 | 4.80 | | 17.7 | | 4.0 | 115 | 78 | | 4.3 | 0.8 |
| C5 | K-70 | 46.14 | 2.30 | 0.48 | 13.9 | | 6.5 | 3.8 | 2.88 | | 20.0 | | 4.0 | 145 | 79 | 0.60 | 7.2 | 0.7 |
| C6 | K-84 | 46.06 | 2.11 | 0.48 | 9.6 | 4.80 | 9.6 | | 11.42 | | 11.5 | | 4.0 | | | | 6.2 | 4.8 |
| C7 | K-84 | 36.41 | 2.21 | 0.48 | 12.7 | | 9.6 | | | | 23.1 | 11.5 | 4.0 | 32 | 95 | 0.35 | 10.7 | 0.7 |
| C8 | K-90 | 47.62 | 2.21 | 0.48 | 14.59 | | 3.8 | | 8.1 | 19.2 | | | 4.0 | 32 | 79.5 | 0.28 | 1.6 | 4.1 |
| C9 | K-100 | 53.51 | 2.21 | 0.48 | 16.8 | | | | 19.2 | | 2.8 | | 4.0 | 50 | 82 | 0.72 | 2.5 | 3.6 |

K-67 SolVin 267 RC from SolVin GmbH & Co. KG (PVC)

K-70 Vinnolit S 4170 from Vinnolit GmbH & Co. KG (PVC)

K-75 SolVin 275 SC from SolVin GmbH & Co. KG (PVC)

ΔL thermal expansion in the temperature range of 68 to 176° F. [%]

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

The invention claimed is:
1. A coating layer composition comprising:
(i) 30 to 70 wt. % of a polyvinyl chloride,
(ii) 1 to 5 wt. % of a heat stabilizer;
(iii) 8 to 24 wt. % of a plasticizer;
(iv) a HCl-reactive compound,
(v) a filler; and
(vi) 1 to 8 wt. % of a pigment,
based on the total weight of the coating layer composition,
wherein the polyvinyl chloride has a K-value in the range of 75 to 100,
wherein the filler has a plate-shape,
wherein the heat stabilizer is a mixed metal stabilizer selected from the group consisting of Ba/Zn carboxylate, Ca/Zn carboxylate, Mg/Zn carboxylate, and mixtures thereof, and,
wherein
(i) the HCl-reactive compound is $CaCO_3$ and is comprised in an amount of 7.0 to 30.0 wt. %, based on the total weight of the coating layer composition, and the filler is talc and is comprised in an amount of 10 to 32 wt. %, based on the total weight of the coating layer composition, or
(ii) the HCl-reactive compound is $CaCO_3$ and is comprised in an amount of 2.5 to 30.0 wt. %, based on the total weight of the coating layer composition, the filler is mixture of talc and mica and is comprised in an amount of 3 to 40 wt. %, based on the total weight of the coating layer composition, a ratio of the amount of talc to the amount of $CaCO_3$ is in the range of 0.5 to 8.0, and a ratio of the amount of talc to the amount of mica is in the range of 2 to 8, or
(iii) the HCl-reactive compound is a mixture of $CaCO_3$ and wollastonite and is comprised in an amount of 2.5 to 30.0 wt. %, based on the total weight of the coating layer composition, the filler is mixture of talc and mica and is comprised in an amount of 3 to 40 wt. %, based on the total weight of the coating layer composition, a ratio of the amount of talc to the amount of $CaCO_3$ is in the range of 0.5 to 8.0, a ratio of the amount of talc to the amount of mica is in the range of 2 to 8, and a ratio of the amount of talc to the amount of wollastonite is in the range of 1.0 to 8.0.

2. The coating layer composition according to claim 1, wherein the polyvinyl chloride is selected from the group consisting of S-PVC, E-PVC, M-PVC, CPVC, and mixtures thereof.

3. The coating layer composition according to claim 1, wherein the plasticizer is selected from the group consisting of epoxidized vegetable oils, epoxidized fatty acids, epoxidized fatty acid esters, and mixtures thereof.

4. The coating layer composition according to claim 1, wherein the heat stabilizer is Ca/Zn carboxylate, and wherein the plasticizer is selected from the group consisting of epoxidized vegetable oils, epoxidized fatty acids, epoxidized fatty acid esters, and mixtures thereof.

5. The coating layer composition according to claim 1, wherein a ratio of the amount of the plasticizer to the amount of the polyvinyl chloride comprised in the coating layer composition is in the range of 0.23 to 0.37.

6. The coating layer composition according to claim 1, wherein a ratio of the amount of the HCl-reactive compound to the amount of the polyvinyl chloride comprised in the coating layer composition is in the range of 0.03 to 0.50.

7. The coating layer composition according to claim 1, wherein a ratio of the amount of the filler to the amount of the polyvinyl chloride comprised in the coating layer composition is in the range of 0.05 to 0.85.

8. The coating layer composition according to claim 1, wherein the coating layer composition has a melt volume-flow rate of less than 70 $cm^3/10$ min.

9. The coating layer composition according to claim 1, wherein the coating layer composition has a Vicat A softening temperature of more than 75° C.

10. The coating layer composition according to claim 1, wherein the filler has a particle size average $D50_{ls}$, determined by laser scattering according to ISO 13320:2020 in the range of 3 to 30 μm and/or a particle size average $D50_{gls}$ determined by gravitational liquid sedimentation according to ISO 13317-3:2001-03 in the range of 0.8 to 15 μm.

11. The coating layer composition according to claim 1, wherein a ratio of a particle size average $D50_{ls}$ of the filler determined by laser scattering according to ISO 13320:2020 to a particle size average $D50_{gls}$ of the filler determined by gravitational liquid sedimentation according to ISO 13317-3:2001-03 is in the range of 1.5 to 5.0.

12. A coating layer composition comprising:
(i) 30 to 70 wt. % of a polyvinyl chloride,
(ii) 1 to 5 wt. % of a heat stabilizer;
(iii) 8 to 24 wt. % of a plasticizer;
(iv) a HCl-reactive compound,
(v) a filler; and
(vi) 1 to 8 wt. % of a pigment,
based on the total weight of the coating layer composition,
wherein the polyvinyl chloride has a K-value in the range of 75 to 100,
wherein the HCl-reactive compound is wollastonite and is comprised in an amount of 7.0 to 16.0 wt. %, based on the total weight of the coating layer composition, and
wherein the filler is talc and is comprised in an amount of 10 to 32 wt. %, based on the total weight of the coating layer composition.

13. An extrusion product comprising a substrate and a coating layer,
wherein the coating layer comprises the coating layer composition according to claim 1, and
wherein the substrate comprises at least 60 wt. % of a further polyvinyl chloride, based on the total weight of the substrate, the further polyvinyl chloride having a K-value of 74 or less.

14. A process for the preparation of an extrusion product comprising the steps of:
providing a coating layer composition according to claim 1;
providing a substrate composition comprising at least 60 wt. % of a further polyvinyl chloride, based on the total weight of the substrate, the further polyvinyl chloride having a K-value of 74 or less;
feeding each of the coating layer composition and the substrate composition to an extruder, and
extruding the coating layer composition and the substrate composition to obtain an extrusion product.

15. A coating layer composition comprising:
(i) 30 to 70 wt. % of a polyvinyl chloride,
(ii) 1 to 5 wt. % of a heat stabilizer;
(iii) 8 to 24 wt. % of a plasticizer;
(iv) 2.5 to 30.0 wt. % of a HCl-reactive compound,
(v) 3 to 40 wt. % of a filler; and
(vi) 1 to 8 wt. % of a pigment, based on the total weight of the coating layer composition,
    wherein the polyvinyl chloride has a K-value in the range of 75 to 100,
    wherein the HCl-reactive compound is selected from the group consisting of $CaCO_3$, hydrotalcite, zeolite, hydrocalumite, hydroxides of magnesium, hydroxides of aluminum, wollastonite, and mixtures thereof,
    wherein the filler is selected from the group consisting of talc, mica, pyrophyllite, kaolin and mixtures thereof,
    wherein the filler has a plate-shape, and
    wherein the plasticizer comprises: (i) a first plasticizer selected from the group consisting of epoxidized vegetable oils, epoxidized fatty acids, epoxidized fatty acid esters, and mixtures thereof; and (ii) a second plasticizer being a phthalic acid ester, and wherein the first plasticizer is comprised in an amount of 8 to 21 wt. % and the second plasticizer is comprised in an amount in the range of 0.1 to 3.0 wt. %, based on the total weight of the coating layer composition.

* * * * *